US009083811B2

(12) United States Patent
Sharma et al.

(10) Patent No.: US 9,083,811 B2
(45) Date of Patent: Jul. 14, 2015

(54) METHOD AND APPARATUS TO DYNAMICALLY ENABLE AND CONTROL COMMUNICATION LINK OPTIMIZATIONS ON A COMMUNICATION DEVICE

(75) Inventors: Sandeep Sharma, San Diego, CA (US); Mohammed Ataur R. Shuman, San Diego, CA (US); Shobha Subbaramoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 166 days.

(21) Appl. No.: 13/412,232

(22) Filed: Mar. 5, 2012

(65) Prior Publication Data

US 2013/0231049 A1 Sep. 5, 2013

(51) Int. Cl.
*H04B 7/00* (2006.01)
*H04M 1/72* (2006.01)
*H04M 1/725* (2006.01)
*G06F 1/16* (2006.01)
*G06F 1/32* (2006.01)
*H04M 1/23* (2006.01)
*H04B 1/3888* (2015.01)
*H04W 4/10* (2009.01)
*H04W 76/00* (2009.01)

(52) U.S. Cl.
CPC ......... *H04M 1/72527* (2013.01); *G06F 1/1632* (2013.01); *G06F 1/3209* (2013.01); *H04M 1/72575* (2013.01); *H04B 1/3888* (2013.01); *H04M 1/236* (2013.01); *H04M 2250/02* (2013.01); *H04M 2250/04* (2013.01); *H04W 4/10* (2013.01); *H04W 76/005* (2013.01)

(58) Field of Classification Search
CPC ... G06F 1/1632; H04B 1/3888; H04M 1/236; H04M 1/72527; H04M 1/72575
USPC .......................................... 455/41.2
See application file for complete search history.

(56) References Cited

U.S. PATENT DOCUMENTS 6,188,917 B1 2/2001 Laureanti
6,671,521 B1 12/2003 Yu
(Continued)

FOREIGN PATENT DOCUMENTS

EP 1928161 A1 6/2008
EP 1959655 A1 8/2008
(Continued)

OTHER PUBLICATIONS

International Search Report and Written Opinion—PCT/US2013/029140—ISA/EPO—Jun. 3, 2013.

*Primary Examiner* — Wesley Kim
*Assistant Examiner* — Devan Sandiford
(74) *Attorney, Agent, or Firm* — Raphael Freiwirth

(57) ABSTRACT

Embodiment methods and systems include external hardware that can be fitted to a wireless communication device to optimize group communications on the wireless devices. The wireless device may be coupled to an external case configured with a physical button that enables group communication such as push-to-talk and other push-to-experience capabilities. Optimizations for push-to-talk communication may be implemented in a push-to-talk mode in response to detecting connection to the external hardware. Signaling between the external case and the wireless device allows detection of the switch to (or from) push-to-talk mode when a user depresses (or releases) the hard key.

115 Claims, 13 Drawing Sheets

(56) References Cited

U.S. PATENT DOCUMENTS

| | | | |
|---|---|---|---|
| 7,062,286 B2 | 6/2006 | Grivas et al. | |
| 7,298,320 B1 | 11/2007 | Whiteside et al. | |
| 7,526,306 B2 | 4/2009 | Brems et al. | |
| 7,603,139 B1 | 10/2009 | Tom | |
| 7,865,205 B1 | 1/2011 | Lundy et al. | |
| 8,548,608 B2* | 10/2013 | Perek et al. | 700/66 |
| 2002/0098845 A1* | 7/2002 | Hata et al. | 455/445 |
| 2003/0229723 A1* | 12/2003 | Kangas et al. | 709/310 |
| 2004/0147231 A1* | 7/2004 | Marler et al. | 455/90.1 |
| 2004/0266468 A1 | 12/2004 | Brown et al. | |
| 2005/0107046 A1 | 5/2005 | Desbarats et al. | |
| 2005/0149951 A1* | 7/2005 | Uola et al. | 719/328 |
| 2006/0046794 A1 | 3/2006 | Scherschel et al. | |
| 2006/0222152 A1* | 10/2006 | Elias et al. | 379/88.13 |
| 2006/0240868 A1* | 10/2006 | Kaplan et al. | 455/558 |
| 2007/0239885 A1* | 10/2007 | Vadlakonda et al. | 709/232 |
| 2008/0200208 A1* | 8/2008 | Llanos et al. | 455/557 |
| 2009/0054097 A1 | 2/2009 | Kim et al. | |
| 2009/0207852 A1 | 8/2009 | Greene et al. | |
| 2010/0078343 A1 | 4/2010 | Hoellwarth et al. | |
| 2010/0144392 A1* | 6/2010 | Felt et al. | 455/566 |
| 2010/0227631 A1* | 9/2010 | Bolton et al. | 455/466 |
| 2010/0227643 A1* | 9/2010 | Yew et al. | 455/557 |
| 2010/0250794 A1* | 9/2010 | Hanks et al. | 710/33 |
| 2010/0255820 A1* | 10/2010 | Maly et al. | 455/414.1 |
| 2010/0293217 A1* | 11/2010 | Srinivasan et al. | 709/202 |
| 2011/0034185 A1* | 2/2011 | Hartmaier et al. | 455/456.4 |
| 2011/0200182 A1* | 8/2011 | Kodama et al. | 379/201.04 |
| 2011/0202910 A1* | 8/2011 | Venkatakrishnan et al. | 717/171 |
| 2012/0315877 A1 | 12/2012 | Lewis | |
| 2013/0007852 A1 | 1/2013 | Ivanov et al. | |
| 2013/0231100 A1* | 9/2013 | Sharma et al. | 455/418 |

FOREIGN PATENT DOCUMENTS

| | | |
|---|---|---|
| WO | 0145282 A1 | 6/2001 |
| WO | 03103174 A1 | 12/2003 |
| WO | 2004028026 A1 | 4/2004 |
| WO | 2004034598 A2 | 4/2004 |
| WO | 2004040923 A1 | 5/2004 |

* cited by examiner

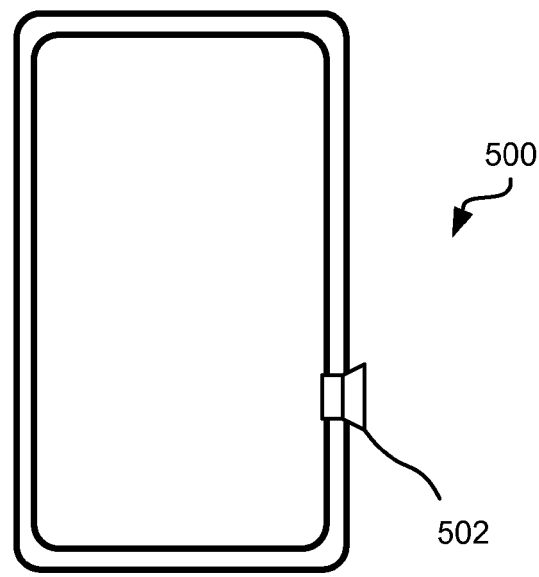
FIG. 5A
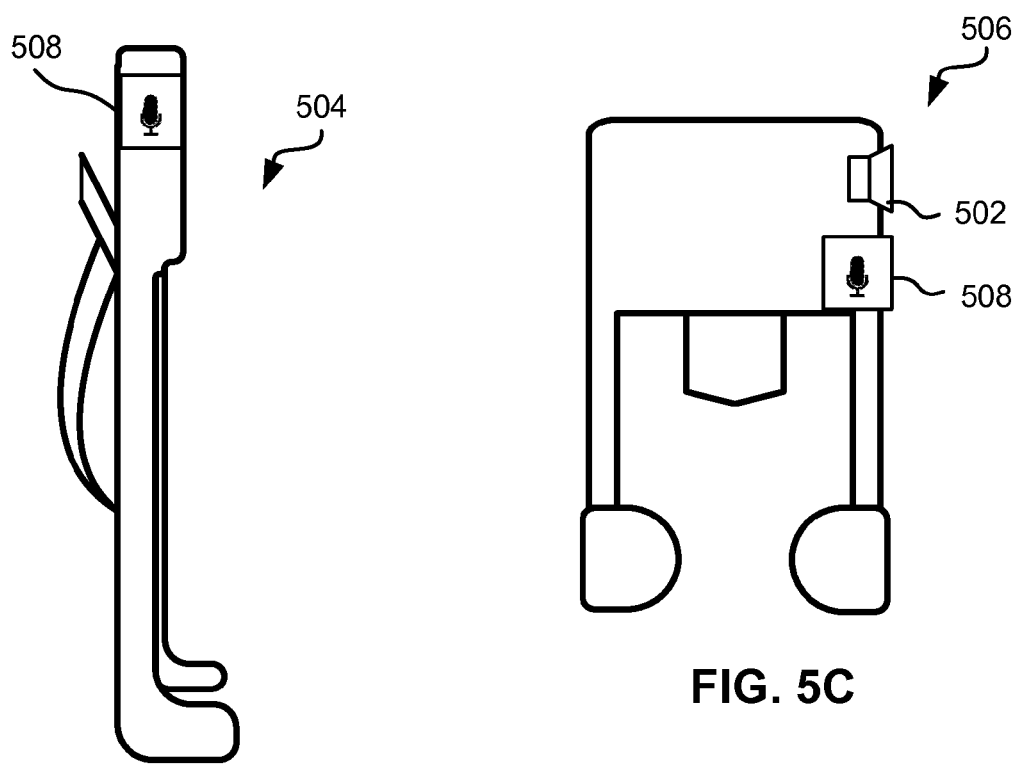
FIG. 5B
FIG. 5C

METHOD AND APPARATUS TO DYNAMICALLY ENABLE AND CONTROL COMMUNICATION LINK OPTIMIZATIONS ON A COMMUNICATION DEVICE

FIELD

The present application relates generally to mobile communication device user interfaces, and more particularly to enabling and controlling features of a mobile communication device by an external case.

BACKGROUND

Push-to-talk ("PTT") is a well known group communication technology that is used in many applications in which there is benefit from a group of individuals being able to hear the same transmissions. Familiar examples include police, fire, rescue, and delivery personnel.

Generally, the number of smartphones that offer group communication capabilities, such as PTT or other push-to-experience ("PTX") capabilities, is limited. There exist software applications that may be downloaded by a smartphone to provide the smartphone with a group communication capability. Generally, this group communication software application may utilize the touch screen display/user interface of the smartphone. For example, a user may touch or tap an icon on the touch screen to utilize a push-to-talk service. Since the capabilities and optimizations that are used to enable high performance group communications tend to have high battery usage, it is generally beneficial for a user to have the ability to turn off group communication mode when not in use, such as through the software application.

However, the use of a touch screen interface contrasts greatly with a conventional PTT "walkie-talkie" type hard key, which is typically mounted on the side of the communication device. Since smartphones lack a hard key PTT input button, a user must look at the touchscreen in order to push the talk button, which requires two hands and the user's visual attention. This makes smartphone group communication applications less desirable and inappropriate to many users of traditional PTT/PTX communication devices which have a side mounted talk button that can be operated single handedly without a need to look at the device.

SUMMARY

The various embodiments provide a method for enabling a communication link on a wireless device, including detecting a connection between the wireless device and an external structure associated with the wireless device being positioned in the external structure, the external structure comprising one or more physical buttons, and activating group communication functionality in response to detecting the connection.

In an embodiment, a method of receiving a group communication attempted at a wireless device includes determining whether a group communication mode is enabled on the wireless device, receiving a talk spurt if the group communication mode is enabled on the wireless device, and receiving a message if the group communication mode is not enabled on the wireless device. The message may be received, for example, as an overhead signaling message, a voice note, a SMS, an email, or any other form of non-PTT communication.

The various embodiments provide a retrofit or adjunct PTT/PTX hard key interface capability for a wireless communications device in the form of a case structure, holster or jacket that includes a hard key input button configured to enable users to use smartphones in a conventional PTT manner. In another embodiment, a method of initiating a group communication on a wireless device includes positioning the wireless device within an external case that includes a physical button configured to generate a key-press code when depressed, communicating the key-press code to the wireless device when the physical button is depressed, interpreting the key-press code received from the external case as corresponding to a group communication operation, and performing the group communication operation in response to receiving the key-press code. The various embodiments may be implemented to initiate and/or receive communications among a group of devices, or with a single device (e.g., in a one-to-one PTT call).

In the various embodiments, the connection may be a physical connection between the device and the external case, or may be in the form of wireless data transmission, for example, via Bluetooth® signals. In embodiments, the external case may further include a power supply, such as a lithium ion battery to power a Bluetooth® transmitter/receiver. In the various embodiments, the external case may be a physical button positioned on the side of the case so as to be positioned like a walkie-talkie key. In an embodiment, the external case may include a glass or plastic outer side that protects a touch screen on the smartphone while allowing the user to view the display.

In the various embodiments, the wireless communication device may include a PTT/PTX case detection module configured to detect a connection event or disconnection event associated with a PTT/PTX external case. This PTT/PTX case detection module may be a hardware port or a Bluetooth® interface. In response to detecting a connection event, a PTT mode management module may be activated in the wireless communication device to automatically pre-load a PTT/PTX application in the wireless communication device, switching to an alternative user experience by removing the PTT/PTX soft-key from the wireless communication device user interface (UI) by presenting a hard key press/release based PTT/PTX experience instead. The PTT/PTX mode management module may also automatically enable various optimizations associated with PTT communication, or, in the case of a disconnection event, to disable such optimizations. The PTT/PTX external case may include a switch, such as a multi-position switch, that enables users to manually select different level of optimization. For example in addition to the PTT hard key, the case may also include a switch configured to enable a user to select full optimization (i.e., a full activity mode), medium optimization (i.e., a partial activity mode) and no optimization for the PTT/PTX communication. Such PTT/PTX optimizations may include, for example, enabling PTT/PTX features that are customized to the type of PTT/PTX case, optimizing quality of service (QoS) for PTT/PTX communication, enabling Data over Signaling (DoS) to speed up initiation of PTT communications, selecting appropriate paging cycles for the desired latency on PTT communication (i.e., setting the slot cycle index on an EVDO device, or configuring DRX for a LTE device), and enabling dynamic switching of vocoders or selection of an optimal vocoder configuration, for example, bundling factor, interleaving factor, rate etc. In another example, the PTT/PTX external case may include a plurality of switches.

In another example, the PTT/PTX mode management module may enable an interface between the applications processor and modem processor of the wireless device so that the applications processor can access PTT communication optimizations (e.g., DoS, selection of paging cycles, access vocoder resources, etc.) for running downloaded applications. Further, the PTT/PTX mode management module may load application-specific data presets residing in memory on the PTT/PTX external case. Such presets may include, for example, user interface themes, alert strings, emoticons, presence status, etc.

In another example, the PTT/PTX application may be fully or partially resident on the modem processor itself and the presence of the PTT/PTX external case may cause the PTT/PTX mode management module to load data presets.

Various embodiments include wireless communication devices including processors configured to perform operations of the embodiment methods disclosed herein. Various embodiments also include wireless communication devices including means for performing functions of the embodiment methods disclosed herein. Various embodiments also include non-transitory processor-readable storage media having stored thereon processor-executable instructions configured to cause a processor to perform operations of the embodiment methods disclosed herein. Various embodiments also include communication systems including a wireless device and a removable external structure. Various embodiments also include external structures for a wireless communication device.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 5A is an illustration of a PTT/PTX external case suitable for use with the various embodiments.

FIGS. 5B and 5C are illustrations of holster PTT/PTX external structures suitable for use with the various embodiments.

DETAILED DESCRIPTION

Figure 1:
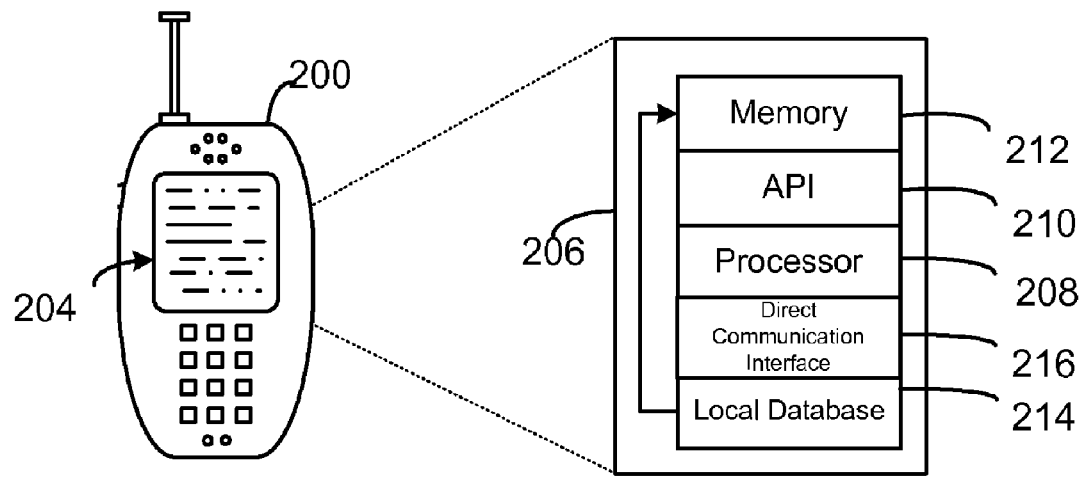
FIG. 1 is a representative diagram of a wireless communication device suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile communication device", "wireless device", "mobile device", "wireless communications device", "smartphone", and "computing device" are used interchangeably herein to refer to any one or all of cellular telephones, smartphones, personal or mobile multi-media players, personal data assistants (PDA's), laptop computers, tablet computers, smartbooks, palm-top computers, wireless electronic mail receivers, multimedia Internet enabled cellular telephones, wireless gaming controllers, and similar personal electronic devices which include a programmable processor and memory and circuitry for transmitting and receiving voice and/or other data over a wireless communication link.

The term "group communication" is used in the following descriptions to refer to a type of communication link functionality that allows a user to simultaneously transmit from a calling device to one or more receiving devices without requiring an existing connection, including, but not limited to, push-to-talk (PTT) communications, such as push-to-talk over cellular (PoC) transmissions, push to transmit (PTX), and other push-to-experience communications including, but not limited to, push-to-content transmissions, push-to-PC calls, push-to-SMS messages, push-to-locate GPS signals, etc. In the various embodiments, such communications may be half-duplex or full-duplex communications, and may be between a calling device and one or multiple receiving devices. Since PTT communications is a well known type of group communication, the terms "PTT," "PTX" and "PTT/PTX" are used herein in the description of the various aspects for ease of reference. However, the use of "PTT," "PTX" and "PTT/PTX" in describing the various embodiments is not intended to limit the nature of the group communication, the methods or devices recited in the claims to PTT and/or or PTX to the exclusion of other types of group communication unless specifically recited in the claims themselves.

The terms "jacket add-on", "case", "external structure" and "external case" are used interchangeably herein to refer to any one or all of protective cases, covers, jackets, skins, shells, pouches, holsters, and similar removable accessories for mobile devices.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

The current portfolio of smartphones offering PTT and PTX capability is limited and is offered only by a handful of OEMs. Thus, the choice of handsets for the end user is limited. In recent times, smartphones have become capable of providing PTT and PTX functionality through software solutions, such as downloadable or pre-loaded applications on a variety of hardware platforms and mobile operating systems. Although this functionality provides flexibility in terms of device selection and obtaining the PTT/PTX software, implementing such functionality on typical smartphones takes away from the core PTT/PTX experience of initiating communication through a dedicated hard key. In particular, a hard key based PTT/PTX experience is more intuitive and provides an easier transition for hardcore/legacy PTT users (e.g. iDEN). Moreover, soft key and user-interface (UI) based PTT/PTX experience requires a user to look at the device screen to ensure that the right soft keys are tapped, potentially leading to a high rate of false PTT/PTX initiations. Further, a soft key based UI takes up a sizeable portion of the screen space.

The various embodiments provide a user-friendly mechanism for initiating communication link functionality, such as PTT and other group communications capabilities, in a wireless communication device in conjunction with a special handset jacket add-on. In an embodiment, the jacket add-on is a PTT/PTX external case that provides an exterior portion fitting the wireless device, and one or more physical buttons or hard keys for executing the communication function. The communication link functionality may be provided or initiated by initiating or activating a communication application, such as a group communication application downloaded or pre-loaded onto the wireless communication device. While the type of communication link functionality that may be initiated in response to a depress of a physical button or key on the external case may be any type of communication, for ease of description the various embodiments are described below with reference to PTT or group communications, which are illustrative examples of communication link functionalities. However, the claims are not limited to PTT or group communications unless specifically recited.

The various embodiments may be implemented on a wide range of mobile communication devices, including most Internet-enabled mobile phones, smartphones, and other wireless communication devices that are not manufactured with dedicated hardware (e.g., a PTT button) for group communication functionality. The external case according to an embodiment may also be configured with a switch-based selector to enable the user to choose a specific communication mode or state. In this manner, the external structure may allow dynamic switching between various communication modes and/or various availability (i.e., "presence") states on the smartphone through user manipulation of the switch. Examples of communication modes that may be selected through positioning of a mode selection switch include, for example, a full group communication mode, a listen-only mode, an offline mode (i.e., unavailable mode), and a do not disturb mode, to name but a few. Further, manipulation of the switch may set the "presence state" information for the smartphone for incoming communications.

Push-to-talk (PTT) and similar group communication protocols typically use half-duplex communication lines, using a button to switch from voice reception mode to transmit mode. Such communications may be particularly useful in group work contexts, such as on construction sites, in control dispatches, police, fire and rescue situations, and in other situations requiring coordination between several parties who will benefit from hearing all communications among all participants. Push-to-Talk over Cellular (PoC) is a service option for cellular phone networks that allows a subscriber to use his or her mobile phone in group communications much like a "walkie-talkie" with unlimited range. PTT cellular calls also provide half-duplex communications in which while one person transmits, the other participant(s) receive. PoC combines the operational advantages of PTT with the interference resistance and other virtues of mobile phones.

FIG. 1 illustrates an example wireless telecommunication device 200 that includes software to provide a "Push-To-Talk" (PTT) capability, which opens a direct communication to a target device, e.g., an endpoint associated with an IP address. In various embodiments, the wireless communication device 200 may include a computer platform 206 that can handle voice and data packets, execute software applications, and transmit information across a wireless network. The computer platform 206 includes, among other components, a processor 208 such as an application-specific integrated circuit ("ASIC") or a RISC processor such as those that implement the ARM architecture. The processor 208 is installed at the time of manufacture of the wireless communication device 200 and is not normally upgradeable. The processor 208 or other processing device executes an application programming interface ("API") layer 210, which includes the resident application environment, and may include the operating system loaded on the processor 208. The resident application environment interfaces with any resident programs in the memory 212, e.g., a computer readable storage medium of the wireless communication device 200. An example of a resident application environment is the "binary runtime environment for wireless" (BREW®) software developed by Qualcomm® for wireless communication device platforms.

As illustrated in FIG. 1, the wireless communication device 200 may be a wireless communication telephone with a graphics display 204, but may also be any wireless device with a computer platform 206 as known in the art, such as a personal digital assistant (PDA), a tablet computer, a smartbook, a pager with a graphics display 204, or even a separate computer platform 206 that has a wireless communication portal, and may otherwise have a wired connection to a network or the Internet. Further, the memory 212 may include any one or more of read-only or random-access memory (RAM and ROM), EPROM, EEPROM, flash cards, or any memory common to computer platforms. The computer platform 206 may also include a local database 214 for storage of software applications not actively used in memory 212. The local database 214 is typically comprised of one or more flash memory cells, but may be any secondary or tertiary storage device as known in the art, such as magnetic media, EPROM, EEPROM, optical media, tape, or soft or hard disk. The graphics display 204 may present information about an ongoing group call, or other group communication session.

The computer platform 206 may also include a direct communication interface 216 that can open a direct communication channel. The direct communication interface 216 may also be part of the standard communication interface for the wireless communication device 200 which ordinarily carries the voice and data transmitted to and from the wireless communication device 200. The direct communication interface 216 typically is comprised of hardware as is known in the art.

Figure 2:
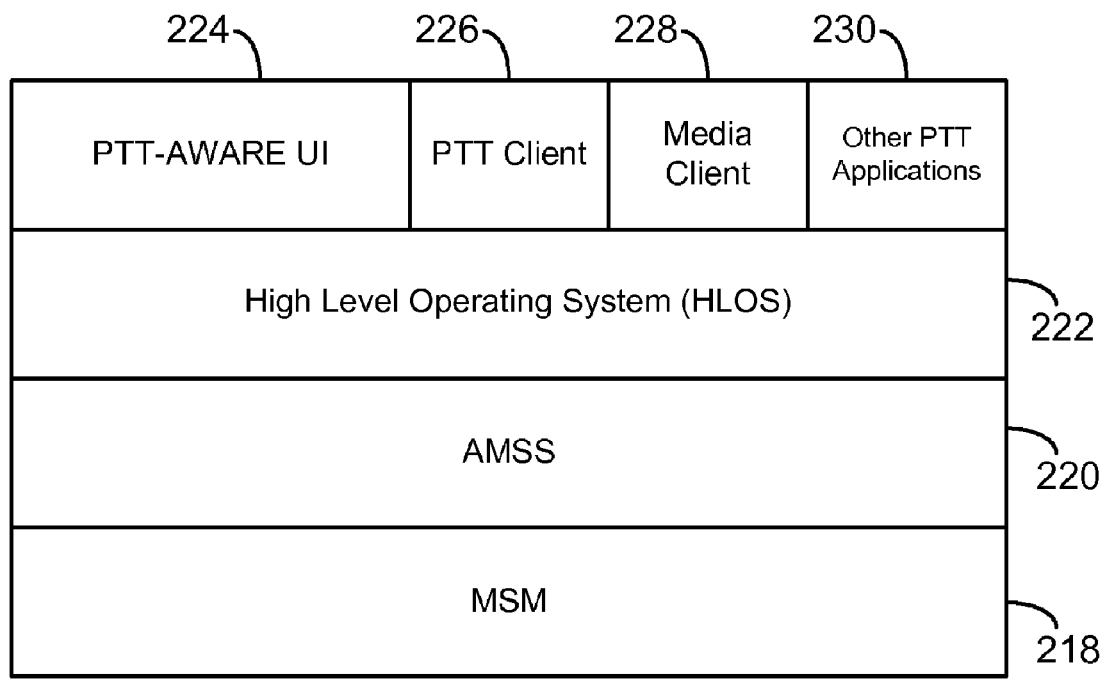
FIG. 2 is a diagram illustrating software layers of a group application client that may include push-to-talk (PTT) functionality.

FIG. 2 is a diagram of one embodiment of the software layers of a group application client that may include, but is not limited to, PTT functionality and data package functionality.

While the embodiment shown in FIG. 2 is implemented in a PTT session, the present system may be utilized in any group communication session setup for transmission of voice and/or data substantially simultaneously among group members. In an embodiment, the computer platform 206 in the wireless communication device environment may include a series of software "layers" developed on top of the Mobile Station Modem (MSM) 218 and the Advanced Mobile Subscriber Software (AMSS) 220, developed by Qualcomm. In this example, the underlying MSM chipset may implement the software protocol stack for the entire suite of CDMA communication technologies that include CDMA2000 1x and CDMA2000 1xEV-DO. In this example the AMSS 220 may be configured to support a wireless communication operating system layer 222, which in an embodiment is a High Level Operating System (HLOS) (e.g., BREW® developed by Qualcomm) The wireless communication operating system layer 222 may provide an application programming interface (API) for chip or device-specific operations, while providing an isolation layer that eliminates direct contact to the AMSS 220 and any OEM software on the computer platform. The wireless communication operating system layer 222 may enable application development that uses wireless communication device features without having to rewrite the application each time a new release of the device-specific software is released.

In this example, the wireless communication operating system 222 may include a PTT client 226 that is configured to offer access to PTT services through an external interface, here shown at a PTT-aware UI 224. The PTT client 226 may include all the functions required to enable a wireless communication operating system 222 application, such as the media client 228. In an embodiment, the PTT client 226 may maintain access to PTT services, respond to communication requests, process all PTT-aware wireless communication operating system applications requests for PTT services, process all outgoing PTT requests, collect and package vocoder packets for originating PTT talk spurts, and parse packets of vocoder data for terminated PTT talk spurts.

In some embodiments, the software to enable PTT/PTX functionality in the wireless communication device 100 may be pre-installed in the device during device manufacture. In other embodiments, at least a portion of the software providing PTT/PTX functionality may be downloaded to the device 200 by the user. In some embodiments, the PTT software may be a downloadable application (e.g., a mobile application).

Figure 3A:
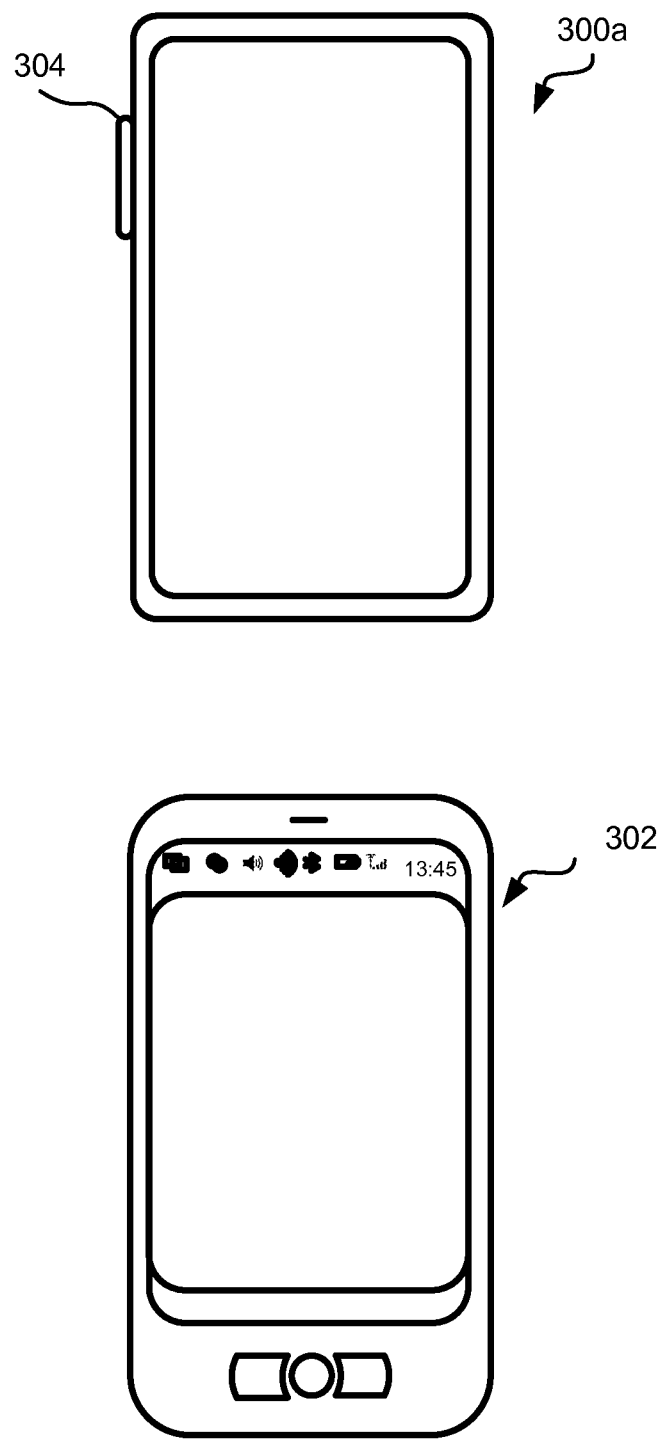
FIG. 3A is an illustration of a wireless device and a PTT/PTX external case according to the various embodiments.

FIG. 3A illustrates an example wireless communication device and an external structure, which is referred to herein as a "PTT/PTX external case," configured to accommodate the wireless communication device, according to the various embodiments. The PTT/PTX external case 300 may provide the wireless communication device 302 with PTT/PTX functionality when the wireless communication device 302 is connected to the PTT/PTX external case 300a. In an embodiment, the PTT/PTX external case 300 may include a physical button in the form of a hard key 304, the use of which is described in further detail below with reference to FIG. 7. In an embodiment, the hard key 304 may be positioned on the side of the PTT/PTX external case 300a, thereby providing an overall feel that is similar to a conventional walkie-talkie. In the various embodiments, the PTT/PTX external case may include a glass or plastic outer side to protect the touch screen device while allowing the user to view the display. The physical button (e.g., hard key 304) may be any known type of button, and may be made similar to a conventional PTT button in shape, feel and movements.

Figure 3B:
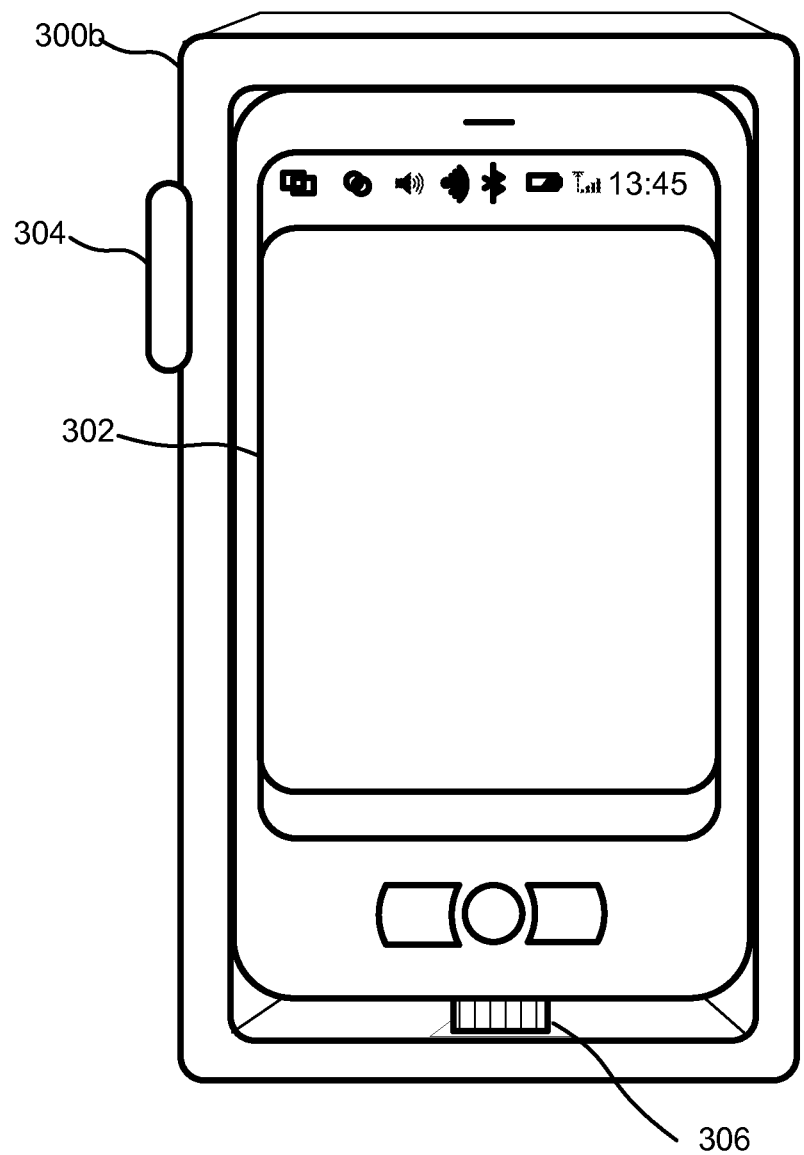
FIG. 3B is an illustration of an embodiment wireless device connected to a PTT/PTX external case.
Figure 3C:
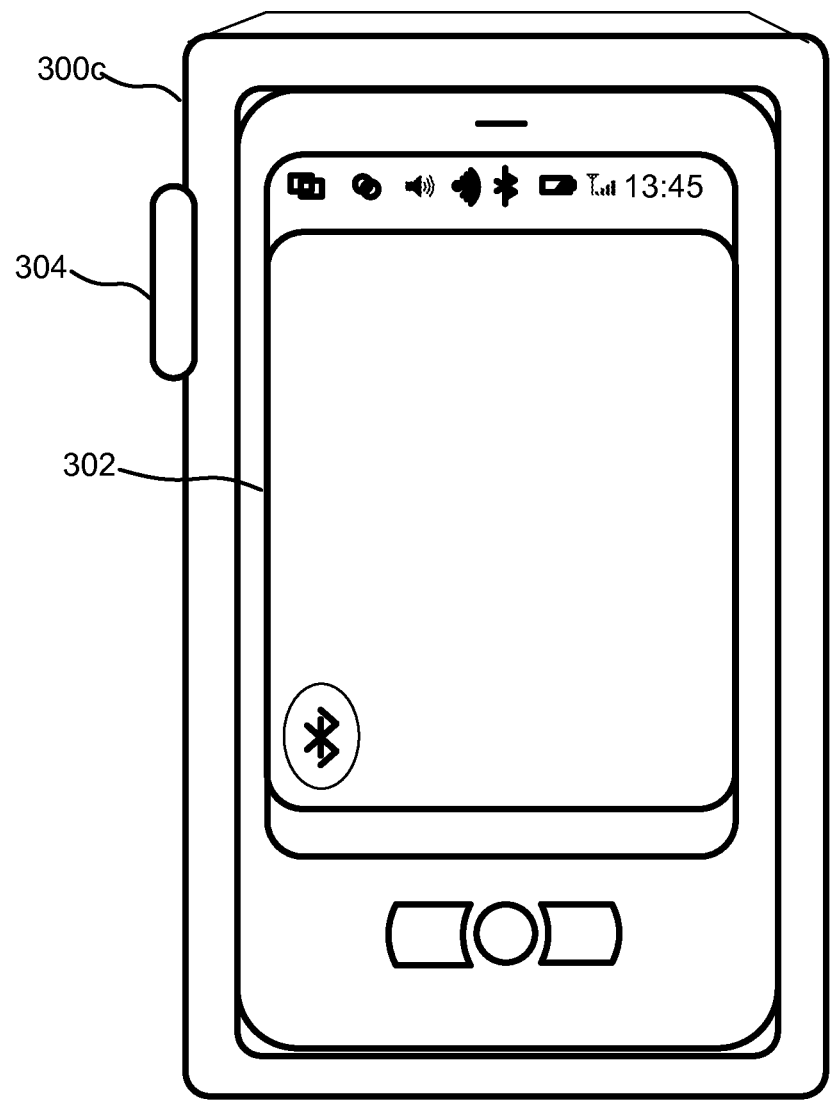
FIG. 3C is an illustration of an embodiment wireless device connected to a PTT/PTX external case.

In an embodiment, an operational connection of the wireless device and the PTT/PTX external case may be accomplished by a physical connection. A physically connected configuration of a wireless communication device and PTT/PTX external case is shown in FIG. 3B. In this embodiment, the PTT/PTX external case 300b may include a connection plug 306 configured to mate with a network connection socket in the wireless communication device 302, such as a USB socket or an iPhone 30 pin dock connector port, thereby providing both a mechanical and electrical connection. In an alternative embodiment, shown in FIG. 3C, the wireless communication device 302 may detect a connection event by receiving a short range wireless signal communication (e.g., Bluetooth®, NFC, etc.) from the external structure, such as a PTT/PTX external case 300c. The PTT/PTX external case 300c may draw power for a Bluetooth® module from a physical connection with the device, for example, through a smartphone-specific port. Alternatively, the PTT/PTX external case 300c may have its own power supply, such as a small battery.

Figure 4A:
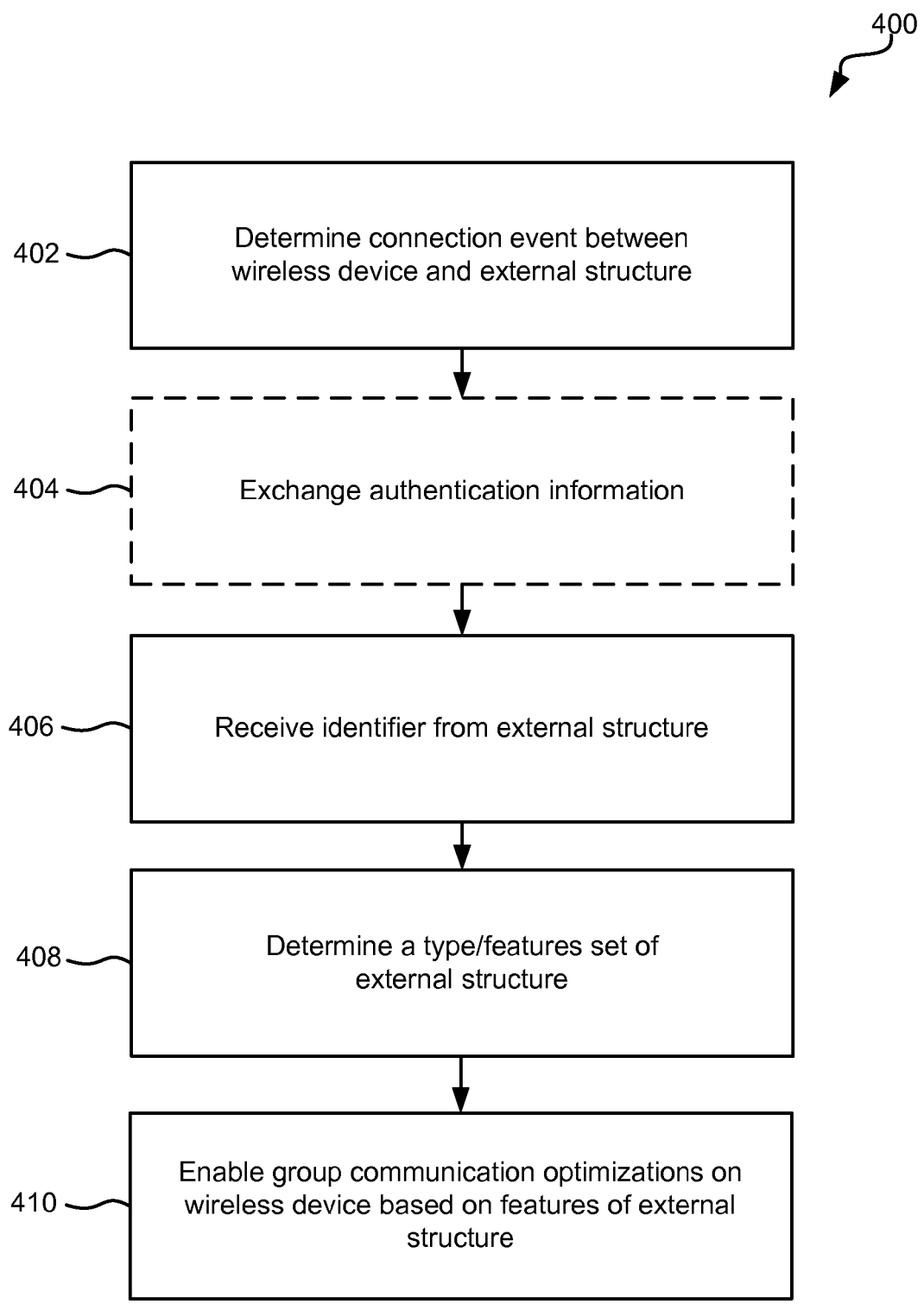
FIG. 4A is a process flow diagram of an embodiment method of optimizing PTT/PTX communications.

FIG. 4A illustrates an embodiment for enabling communication link functionality optimizations on a wireless device. In block 402 of method 400, a connection event may be detected by a wireless device, such as the wireless device 302 illustrated in FIGS. 3A-3C. The connection event may be determined, for example, by detecting a physical connection with a PTT/PTX external case, or by receiving a short distance signal communication is received at the wireless device from a PTT/PTX external case. For example, the connection event may trigger the wireless device to enter a push-to-talk mode (i.e., "PTT mode"), described in further detail below with reference to FIG. 4B.

In an embodiment, recognizing a connection event between the wireless device and the external case in block 402 may be performed by software provided on the wireless device, for example a PTT/PTX case detection module. This PTT/PTX case detection module may be either hardware port based or Bluetooth® interface based, depending on the type of connection between the PTT/PTX external case and the wireless communications device.

In optional block 404, the wireless device 302 and the PTT/PTX external case 300 may exchange authentication information. This authentication information may be in the form of an identifier that is communicated from the PTT/PTX external case 300 to the wireless device 302 that the wireless device can compare to stored identifiers to determine whether the case is the user's case, is a brand or model of case approved for the wireless device, etc. Similarly, the wireless device 302 may transmit an identifier that the PTT/PTX external case 300 can use to perform a similar verification function. For example, the wireless device 302 may be configured to only implement group communication features using a specific PTT/PTX external case. Further, the PTT/PTX external case may be configured to only pass data and features to the user's wireless device, thereby protecting against unauthorized use in case of theft. Therefore, various credentials used for authentication may be exchanged using any of the various methods commonly known in information security.

In block 406, an identifier may be communicated from the PTT/PTX external case 300 and may be received by the wireless device 302, such as part of a handshaking procedure. The identifier may be, for example, a key code, a secret value specified by the user or an organization providing the group communication capability, or a value set by a manufacturer and stored in read only memory. Alternatively, a simple chipset on the PTT/PTX external case may store a hardware identifier which may be set at manufacturing or is programmable, similar to a SIM card used in mobile communication devices. Using the identifier received by the communication link, in block 408, the wireless device may determine the type of the external case.

For example, using the identifier the wireless device 302 may determine whether the case 300 is designated as specialized for particular group communication types. As another example, the identifier or other code information communicated by the case to the wireless device may identify a features set that is configured on the PTT/PTX external case (i.e., PTT/PTX optimizations). For example, cases may be optimized or configured for specific function sets, such as PTT, PTT/PTX, alert-only, PTT with alert, and other group call feature sets. So, the identifier provided by the case may inform the wireless device of the type of case with which it is coupled.

As another example, the PTT/PTX external case may come preloaded with group definitions and be configured to pass on that information to the smartphone when the case is put on. This would allow the smartphone to have temporary access to that group while the case is on the smartphone. Alternatively the PTT/PTX external case may be pre-configured with canned messages/emoticons, allowing cases to be custom configured and optimized for particular users (e.g., companies or organizations purchasing standard cases for their employees) and to enable a richer experience for a given feature set.

In block 410, the wireless device may activate a communication functionality in response to detecting the connection to the external case (block 402). The type of communication functionality activated in block 410 may depend upon the identifier received from the external case in block 406 and/or the type of feature set of the external case determined in block 408. For example, if the identifier, type or feature set indicates that the external case is configured for supporting PTT/PTX communication links, in block 410 the wireless device may enable PTT/PTX communication link functionalities and enable one or more of the features of the PTT/PTX external case to prepare it for use in group communications. For example, the wireless device may send a signal to the case to cause it to enable the PTT hard key and/or activate a far field speaker and/or a far-field microphone (if the case includes either or both of a far field microphone and far-field speaker phone element). Also as part of activating the communication link functionality in block 410, the wireless device may implement actions to optimize the device and its communication links with a wireless network to commence group communications. For example, a number of communication settings associated with conducting a group communication (e.g., PTT/PTX) may be automatically implemented or requested by the wireless device 302 in response to establishing the communication link with a case 300. Such automatic communication settings may include: requesting a level of Quality of Service (QoS) suitable for group communication; requesting a mobile data-over-signaling (MO-DOS) which is a fast signaling channel over EVDO channels used in PTT and other group communication settings; and setting the source cycling index (SCI) which controls the frequency at which the wireless device activates its radio to receive communications. Additionally, the wireless device may set operating conditions to support group communications in block 410, such as disabling its display screen, disabling a touchscreen, etc.

In another embodiment, the PTT/PTX external case may be configured with stored contact information that is accessible to the wireless device while connected to the case. Such contacts may appear on the wireless device in one or more additional contact groups, such as additions to the user's contact database. For example, an employer may provide each employee with a PTT/PTX external case that communicates an additional "Work" group contacts list to their employees' personal wireless devices when the case is attached. Thus, while at work employees may couple their personal wireless devices to the company-provided PTT/PTX external case in order to have ready access to groups of workers they will communicate with during the work day. In another embodiment, the PTT/PTX external case may be configured with information defining one or more groups of contacts that is to be stored in the wireless device memory. While connected to the PTT/PTX external case, a user's contacts stored in the wireless device may be assigned into various contact groups, such as "Personal" and "Work." In another embodiment, a PTT/PTX external case may also provide features that optimize communications with contact groups defined by the PTT/PTX external case. In this manner, employers can enable employees to own their own wireless communication devices that they use on their own time, while ensuring employees have ready communication access to company groups, resources and external authorities when they are at work.

Figure 4B:
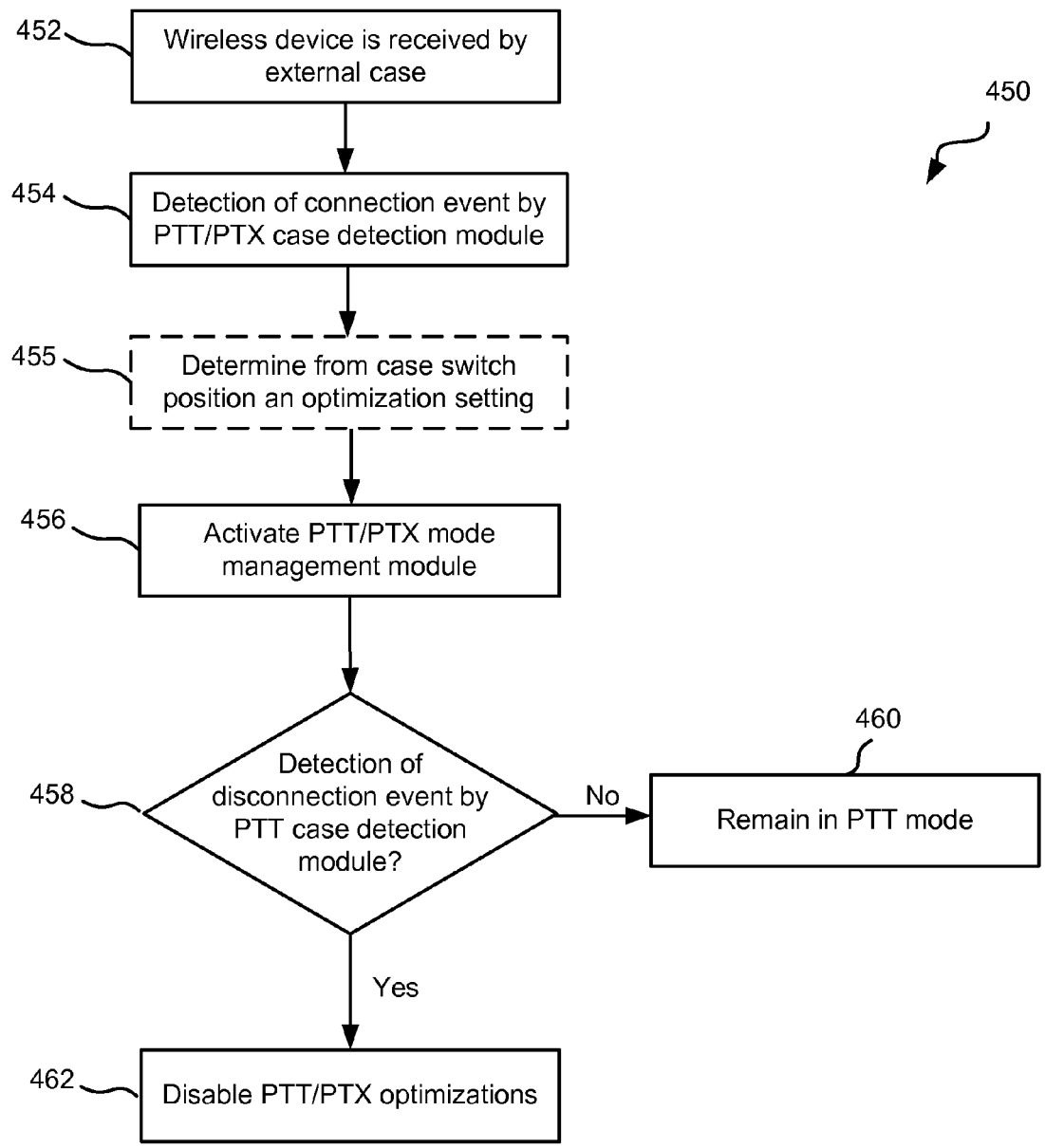
FIG. 4B is a process flow diagram of an embodiment method of activating and deactivating a PTT/PTX communication mode.

In an embodiment, the connection event may cause the mobile communication device and PTT/PTX external case to activate a communication link functionality in the form of a group communication mode (e.g., a PTT/PTX mode), an example of which is shown in FIG. 4B. In block 452 of method 450, the wireless device 302 may be received by an external structure, for example, a PTT/PTX external case 300. In block 454, a PTT/PTX case detection module may detect a connection event. In optional block 455, the PTT/PTX case detection module may detect a position of a configuration switch, such as a multi-position switch 604, 912 (see FIGS. 6 and 9), and determine from the switch position an optimization setting to be implemented on the wireless device 302 (e.g., full optimization, medium optimization or no optimization). In response to detecting the connection event at the PTT/PTX case detection module, a communication link functionality in the form of a PTT/PTT mode management module on the wireless device may be activated, block 456, and optionally communication optimizations may be implemented based on a switch position as determined in optional block 455.

Once activated, the PTT/PTX mode management module may function to allow switching between a plurality of possible PTT/PTX modes, and various PTT/PTX optimization features that are available through the PTT/PTX external case, as described in further detail below with reference to FIG. 6.

As mentioned above, the features set on a PTT/PTX external case may provide a variety of different group communication (e.g., PTT/PTX) optimizations that may all be automatically enabled on a wireless device when it is coupled to the case in block 410 of method 400 (FIG. 4A). Such optimizations may include, for example, enabling PTT/PTX features that are customized to the type of PTT/PTX external case (size, shape, features, etc.) The PTT/PTX optimizations may also include those relating to the quality of the PTT/PTX communication. For example, the PTT/PTX mode management module may enable DOS (Data over Signaling) in order to speed up initiation of the PTT/PTX communication. In another example, the PTT/PTX mode management module may select the proper paging signals for the lowest latency PTT communication. Further, the PTT/PTX mode management module may enable dynamic switching of vocoders and selection of optimal vocoder based on, for example, bundling factor, interleaving factor, etc.

In another example of optimizations that may be implemented in block 410 in response to detecting connection to an external case, the PTT/PTX mode management module may enable an interface between the applications processor and modem processor of the wireless device so that the applications processor can access PTT communication optimizations (e.g., DoS, selection of paging signals, vocoder selection, etc.) for running downloaded applications. Further the PTT/PTX mode management module may load application-specific data presets residing in memory on the PTT/PTX external case. Such data presets may include, for example, user interface themes, alert strings, emoticons, presence status, etc. In this manner, the features set provided by the PTT/PTX external case connection may be further customized for a richer user experience or to implement employer desired features.

In another embodiment, the PTT/PTX mode management module may enable data transfers to the PTT/PTX external case via a network to which the wireless device is connected. For example, when the wireless device and PTT/PTX external case are connected together, new features (e.g., data presets, hardware settings, contact groups, etc.) and/or updates to features already stored on the external case may be sent by a server over a wireless communication network and received at the wireless device. The PTT/PTX mode management module may cause received features to be stored and implemented on the PTT/PTX external case. Once the PTT/PTX external case is disconnected from the wireless device, the new or updated features may remain resident in memory of the PTT/PTX external case.

In another embodiment, the PTT/PTX mode management module may enable or disable specific hardware features in order to optimize group communications in block 410 (i.e., in response to detecting coupling with a PTT/PTX external case). Such hardware features may be present in the wireless device itself. For example, the PTT/PTX mode management module may disable a display and/or touch screen of the wireless device, thereby saving battery power. Additionally, the PTT/PTX mode management module may optimize group communications by enabling hardware features that are provided in the external structure. An example of an external structure according to this embodiment is illustrated in FIG. 5A. The external structure 500 may be configured, for example, with a hardware feature such as speaker 502. When the wireless device 302 is connected with the external structure 500, the PTT/PTX mode management module may activate the speaker 502. FIGS. 5B and 5C illustrate alternative embodiments of a PTT/PTX external structure 504, 506 in the form of a holster. In some embodiments, a wireless device may be coupled with a case, such as PTT/PTX external case 300 in FIGS. 3A-3C, and the case 300 and/or wireless device may be further coupled with a holster 504, 506 to enable PTT/PTX features beyond those provided by the PTT/PTX external case 300 alone. In an embodiment, the holster 504, 506 may be configured with various hardware features. For example, as shown in FIG. 5B, holster 504 may be configured with a far-field microphone 508. When connected with holster 504, the PTT/PTX mode management module may activate the far-field microphone 508, in addition to the optimizations provided by the case. In this manner, a user may be able to initiate group communications without removing the wireless device and case from the holster. FIG. 5C illustrates another example a PTT/PTX external case in the form of a holster 506 that may be configured with a far-field microphone 508 and a far-field speaker 502 to support hands free group communications. When connected with the holster 506, the PTT/PTX mode management module may activate the far-field microphone 508 and the far-field speaker 502, thereby allowing the user to both initiate and receive group communications without removing the wireless device and case from the holster.

The PTT mode of the wireless device 302 may be always on, that is, the device may continue to operate in the PTT mode for the duration of the connection to the PTT/PTX external case 300. In order to revert to the normal state of the wireless device, the PTT/PTX case detection module may be configured to recognize when the wireless device has been removed from the case. For example, in determination block 458 of embodiment method 450 shown in FIG. 4B, the PTT/PTX case detection module may determine whether a disconnection event has occurred. So long as a disconnection event is not detected by the PTT/PTX case detection module (i.e., determination block 458="No"), the wireless device 302 may remain in PTT mode and receive/process PTT communications. When a disconnection event is detected by the PTT/PTX case detection module (i.e., determination block 458="Yes"), the PTT/PTX case detection module may cause the PTT optimizations on the wireless device to be disabled in block 462, such as by de-activating the PTT/PTX mode management module. Additionally, as part of block 462, the wireless device may also take other actions to revert to normal operations, such as activating a display or touchscreen, reverting to normal SCI settings, requesting a QoS level commensurate with normal cellular telephone operations, and deactivating a MO-DOS channel if open. These deactivations may be taken without user action or knowledge, so that removing the wireless device from the PTT/PTX external case automatically configures the device to function as a normal phone. As part of block 462, the case may also take actions to deactivate all group communication (e.g., PTT) capabilities or settings, such as deactivating a speaker and microphone.

Figure 4C:
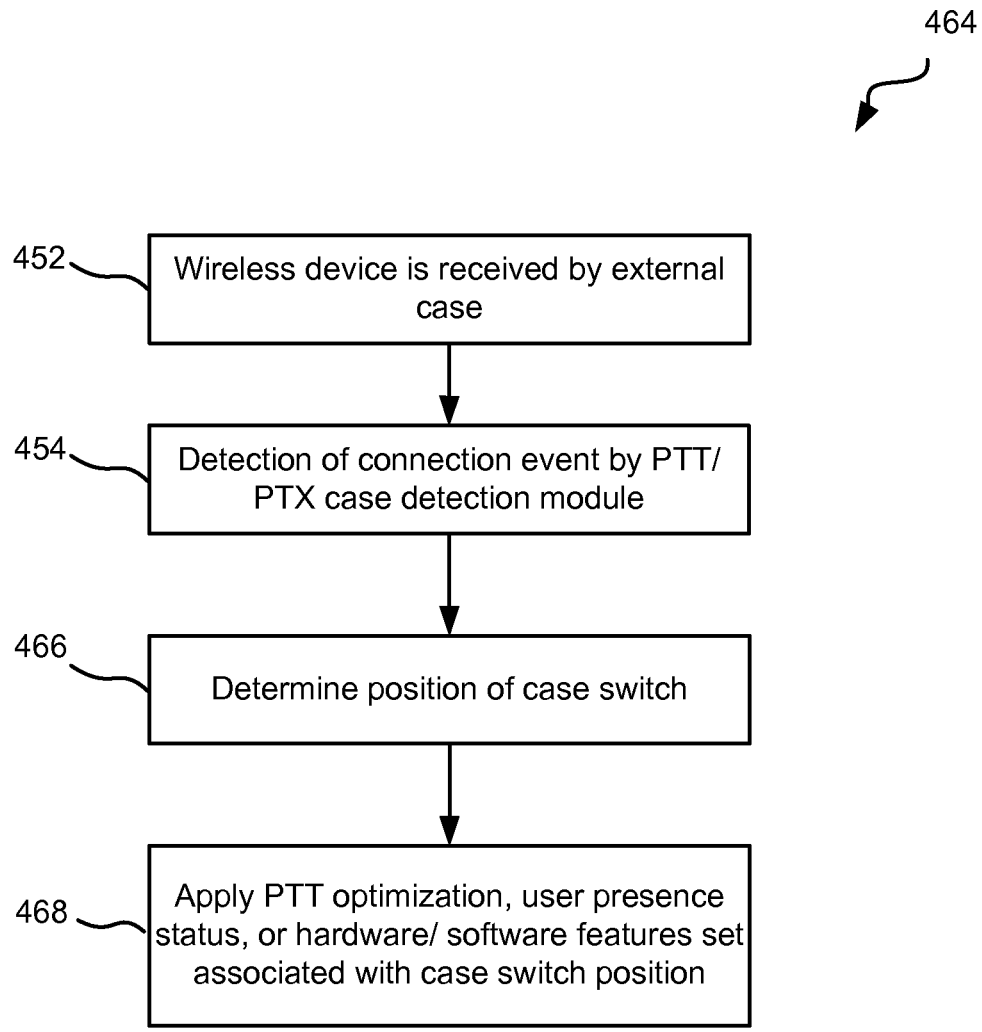
FIG. 4C is a process flow diagram of an embodiment method of controlling communication optimizations and features activation on a wireless device based on a case switch position.

In addition to providing a set of features that support PTT/PTX communications on a wireless device, such as in PTT mode, a PTT/PTX external case may be configured to allow a user to choose to activate less than all of the enabled features by selecting one of a plurality of particular communication modes/states. In an embodiment method 464, shown in FIG. 4C, a mode-selection switch such as a multi-position switch 604, 912 (see FIGS. 6 and 9) on the PTT/PTX external case may be configured to implement different user presence settings and hardware or software features sets, in addition to PTT/PTX optimizations. In method 464, blocks 462 and 464 may be identical to blocks 452 and 454 of embodiment method 450, described above. In block 466, the PTT/PTX case detection module may detect the current position of the mode-selection switch on the PTT/PTX external case. In block 468, based on the mode-selection switch position, the wireless device 302 may apply a specific user presence status, enable a particular hardware or software features set, or activate the PTT/PTX mode management module in order to activate a PTT/PTX optimization mode. These options that may be provided on the PTT/PTX external case by the mode-selection switch in the various embodiments are described in further detail with respect to FIG. 6.

Figure 6:
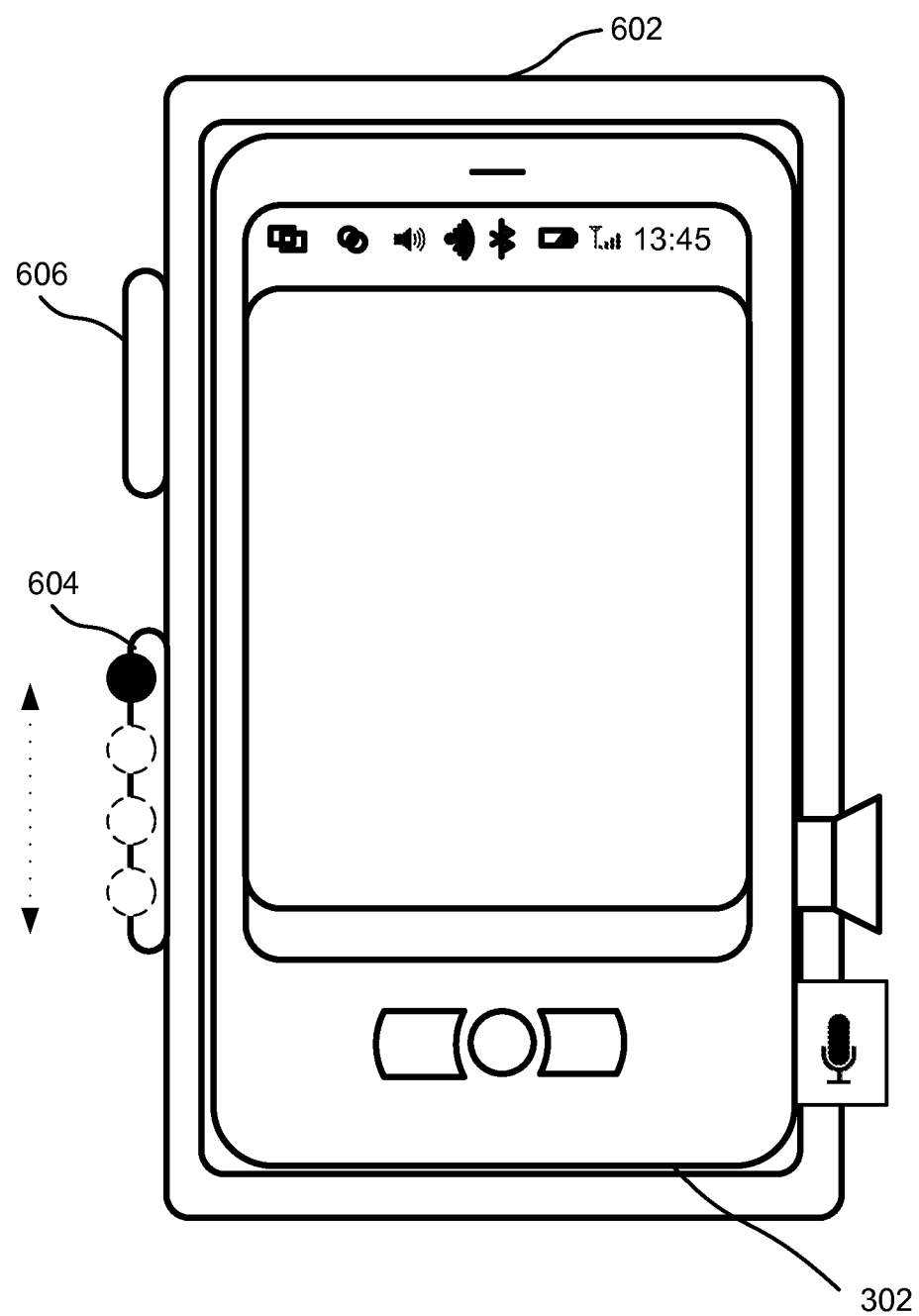
FIG. 6 is an illustration of an embodiment wireless device connected to a PTT/PTX external case.

In an embodiment illustrated in FIG. 6, a PTT/PTX external case 602 may be configured with a mode selection switch 604 to enable a user to manual select different operating modes. The mode selection switch 604 may interface with the PTT/PTX mode management module to instruct the wireless device regarding a sub-set of PTT/PTX optimizations that should be activated, hardware features that should be enabled or disabled, and/or any other settings that should be implemented in the selected mode.

For example, a user may move the mode selection switch 604 to select any one of the various communication modes that are provided by the PTT/PTX external case 602 (e.g., one of four modes as illustrated in FIG. 6). Each of the communication modes may be associated with a sub-set of the features that are supported by the PTT/PTX external case, creating a user presence state for various group communications that is based on the selected communication mode. In another example, the PTT/PTX case may be configured with a plurality of communication features sets, with each position of the mode selection switch 604 associated with a difference features set. In addition, the user's contacts or other designated group may be able to see an indication of the communication mode in which the user's wireless device is presently configured, and/or be informed when the user switches to a different communication mode. Thus, parties attempting to communicate with the user in a group communication may be informed in advance of the user's presence state for that type of group communication, thereby informing the parties in advance whether such communication is optimized and/or enabled on the user's device.

For example, in a "Do Not Disturb" or "alert-only" communication mode, a wireless device may activate all group communication optimizations provided by the PTT/PTX external case except for activation of the speaker. When a PTT communication is sent to wireless device in "Do Not Disturb" mode, the user may receive a voice note or other group communication alert indicating the attempted communication instead of receiving the group communication talk spurts through the speaker. In another example, when the wireless device is in a mode in which the capability for receiving talk spurts is disabled (e.g., a "Do Not Disturb" mode), if a group communication is attempted, the wireless device may be configured to automatically transmit an incomplete call notification to the sender.

In another example, the PTT external case may support a "Listen-Only" selectable communication mode. In a listen-only mode, a wireless device may activate the optimizations provided by the PTT/PTX external case that relate to receiving group communications, including the speaker, but deactivate features that would allow the user to initiate or communicate in group communications. In another example, the PTT/PTX external case may support an "Unavailable" communication mode. In this communication mode, the wireless device may disable all group communication optimizations, thereby providing the same effect as if the wireless device were removed from the case, with the possible exception of physical settings commensurate with being within the holster or external case, such as deactivation of the display or touchscreen.

As discussed above, the PTT/PTX external case 602 may include a physical button or hard key 606 or button which a user may depress to initiate a group communication session or transmit a PTT communication talk spurt. In an embodiment, pressing the hard key 606 may initiate a group communication session via the wireless communication device (e.g., a PTT communication talk spurt).

Figure 7:
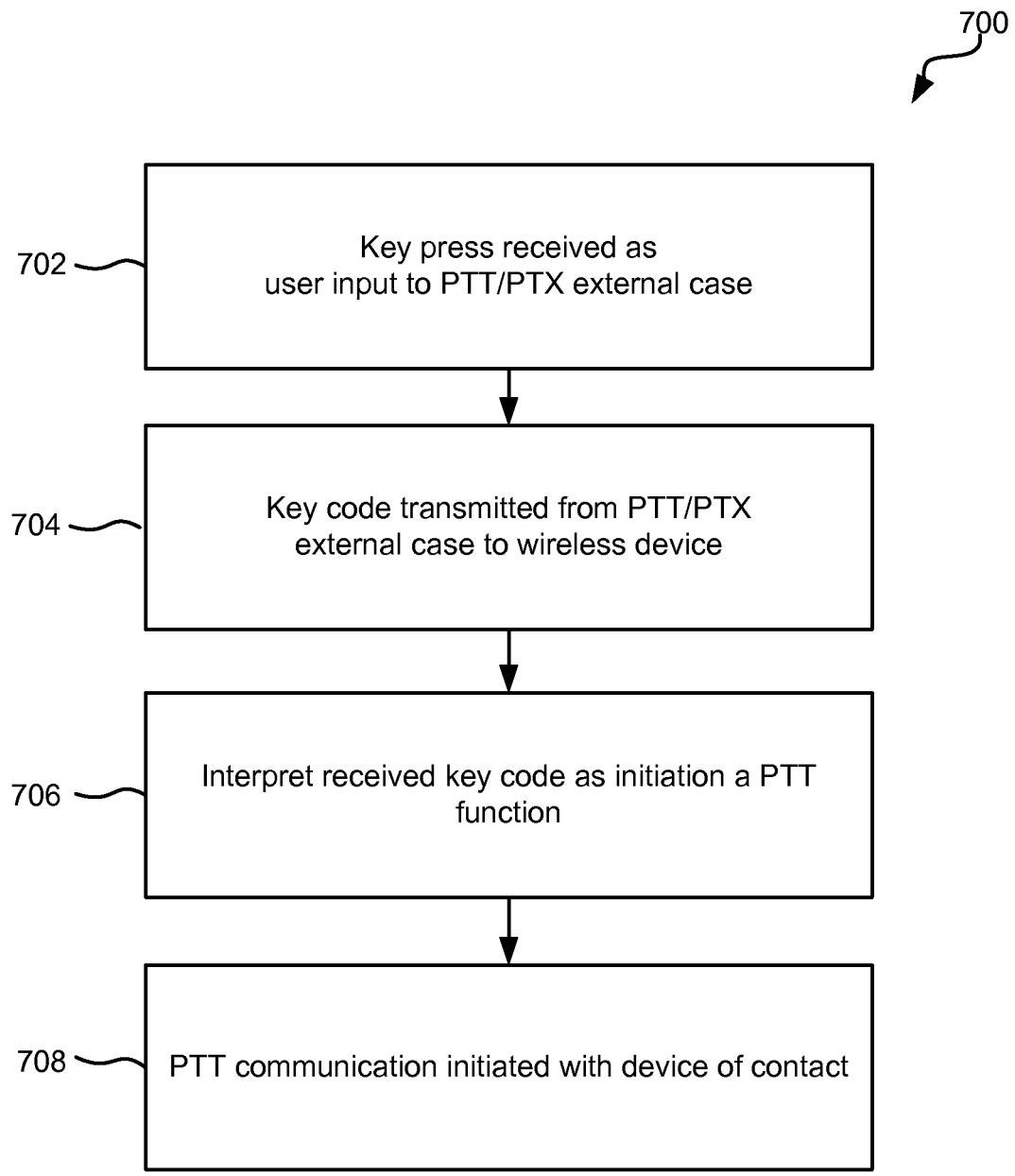
FIG. 7 is a process flow diagram of an embodiment method of initiating a PTT communication.

A software application enabling PTT functionality may cause a wireless device 302 to respond to hard key events on the PTT/PTX external case 602. FIG. 7 illustrates an embodiment method of initiating a PTT/PTX communication on a wireless device connected with a PTT/PTX external case (as described above with respect to FIGS. 3B and 3C) and on which group communication optimizations are enabled (as described above with respect to FIGS. 4A and 4B). In block 702 of method 700, a user input may be received by circuitry in the in the form of a key press at a hard key on PTT/PTX external case. For example, the hard key of the PTT/PTX external case may include conventional circuitry for detecting the key press, which in an embodiment may be connected to a Bluetooth® wireless transceiver. In block 704, a key-press code or other function code or symbol may be communicated to the wireless device via Bluetooth® or via network port. In the embodiment including a Bluetooth® wireless transceiver, the button circuitry and transceiver may be configured to establish and maintain a Bluetooth® link between the case and the smartphone for the duration of the time that the wireless device is running the group communication software application, and to transmit the key-press code or symbol to the smartphone via the Bluetooth® link when the physical button or hard key 606 is depressed. In an embodiment in which the external case circuitry plugs into a network socket on the phone (e.g., USB, iPhone dock, etc.), the button circuitry may be configured to communicate a key-press code to the smartphone processor via the wired network connection or interface. In both embodiments, a PTT/PTX application, for example, running on the wireless device may interpret the received key-press code as a push-to-talk activation event that initiates a push-to-talk function in block 706. In an example embodiment, the PTT/PTX application may be running on the wireless device. In another example embodiment, the PTT/PTX application may be fully or partially resident on the modem processor, and the presence of the PTT/PTX external case may cause the PTT/PTX mode management module to load data presets. In block 708, the push-to-talk communication (i.e., push-to-talk transmission) is initiated with a device of a contact, as if a touch on a touchscreen interface had been received. In this manner, the physical button or hard key 606 on the PTT/PTX external case takes the place of a PTT virtual key that would otherwise be implemented on a touch screen interface of the wireless device by the PTT/PTX application.

The manner in which the PTT/PTX application interprets the key-press code as initiating a push-to-talk function may vary based on the type of connection between the PTT/PTX external case and the wireless device. In an embodiment in which the wireless device is connected to the PTT/PTX external case by a physical connector port (e.g., a smartphone-specific connector port), when a user depresses the physical button or hard key 606, the transmitted key-press code may trigger a hardware interrupt within a processor of the wireless device. That is, the key-press code transmitted to the wireless device may function as a key press event notification signal. This key press event notification may trigger a PTT hard key interrupt subroutine, which calls a PTT hard key interrupt handler that causes the events to be translated to user actions on the application. The subroutine and the PTT hard key interrupt handler may be provided by the PTT/PTX application.

In an alternative embodiment in which the wireless device is connected to the PTT/PTX external case by a Bluetooth® interface, the interpretation of a received key-press code may involve steps related to receiving the signal via the Bluetooth link, performing normal wireless signal verification and error correcting operations to obtain the transmitted symbol, interpreting the received symbol to recognize that it corresponds to a key-press event, and then passing a key-press event notification to the PTT application software.

Operations for determining when a user releases the hard key, indicating termination of a talk spurt or PTX session, may be accomplished in a manner similar to the operations described above for recognizing and acting on the depression of the hard key by the user.

Figure 8A:
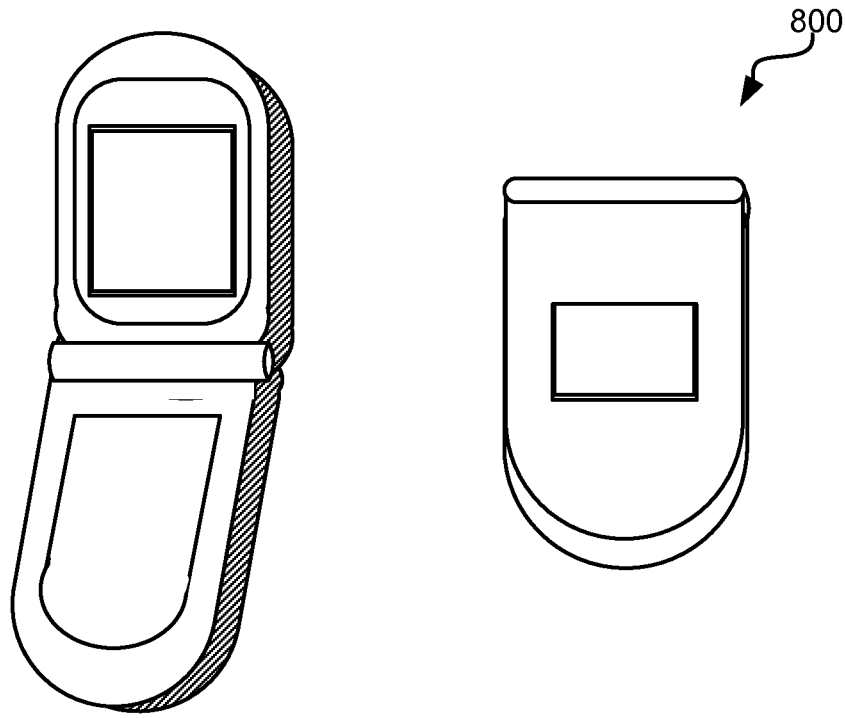
FIG. 8A is an illustration of a flip phone wireless device suitable for use with the various embodiments.
Figure 8B:
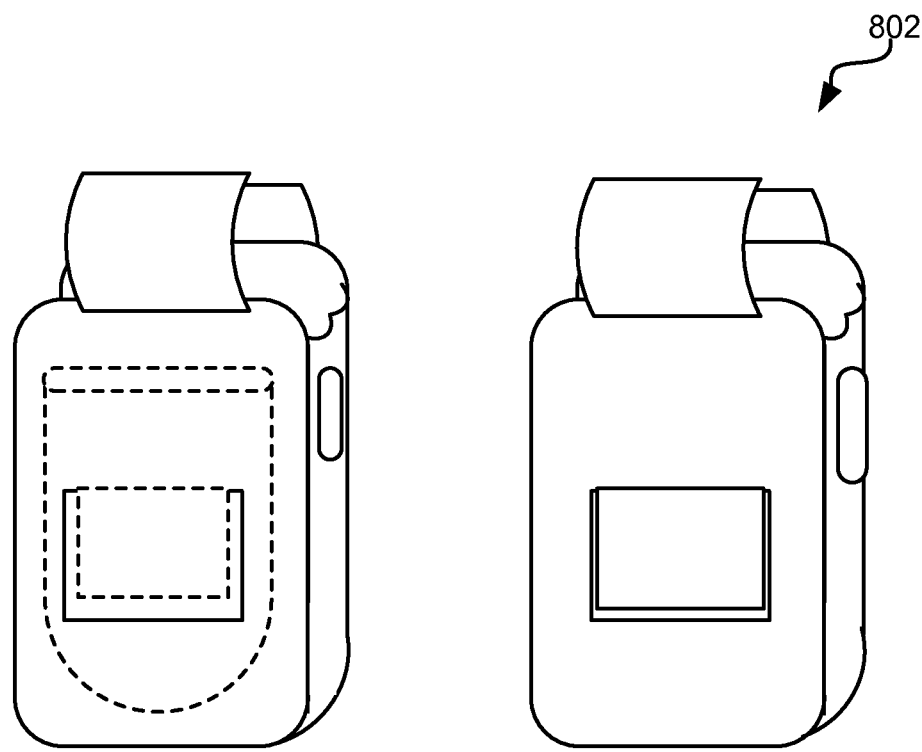
FIG. 8B is an illustration of an embodiment flip phone wireless device connected to a PTT/PTX external case.

The material, size and shape of the PTT/PTX external case may be designed to fit different types of wireless communications devices. For example, FIG. 8A illustrates a flip phone 800, shown in its opened and closed positions. Due to the relative motion of the two flip phone pieces, a PTT/PTX external case designed for such a wireless device requires allowance for such motion. An example PTT/PTX external case 802 designed to hold the flip phone 800 is shown in FIG. 8B. In this embodiment, the PTT/PTX external case 802 is configured in a pouch shape to receive the flip phone 800 in a closed configuration. In this manner, should a user wish to open the flip phone 800 to make a conventional call or check a display (e.g., to read an SMS message or email), the phone can be easily removed by lifting it from the PTT/PTX external case 802.

There are a variety of components that may be incorporated in a PTT/PTX external case in order to implement the group communication capabilities described above on a wireless device. The PTT/PTX external case may further include a power supply, such as a lithium ion battery to power a Bluetooth® transceiver. In some embodiments, the PTT/PTX external case may include a data storage device (e.g., memory) and a controller (e.g., processor or CPU) configured to execute instructions associated with group communication functionality, for example, PTT/PTX functionality, in the PTT/PTX external case and through the PTT/PTX application. The data storage device may have the PTT/PTX application software stored thereon, which may be downloaded to the smartphone memory to execute the application and to communicate via push-to-talk. The PTT/PTX application may be configured to perform further functions within the wireless device, for example, to cause the wireless device to power down the touch screen display in order to save power when communicating via PTT/PTX.

A PTT/PTX controller may be implemented on a single chip, multiple chips or multiple electrical components. For example, various architectures may be used for the PTT/PTX controller, including dedicated or embedded processor, single purpose processor, controller, ASIC, etc. The PTT/PTX data storage device may be read-only memory (ROM), random-access memory (RAM), flash memory, and combinations thereof. Such components may be implemented on a single chip, multiple chips or multiple electrical components. The PTT/PTX data storage device may alternatively or additionally include a solid state disk, a hard disk drive (e.g., a micro drive) and/or an interface socket for receiving removable storage device or memory cards (e.g., SD cards). In addition to the hard key related to PTT/PTX functionality, the PTT/PTX external case may include additional input devices, for example, additional buttons or keys, touch pads, touch sensing surfaces, or mechanical actuators, such as buttons, switches, keys or wheels.

Figure 9:
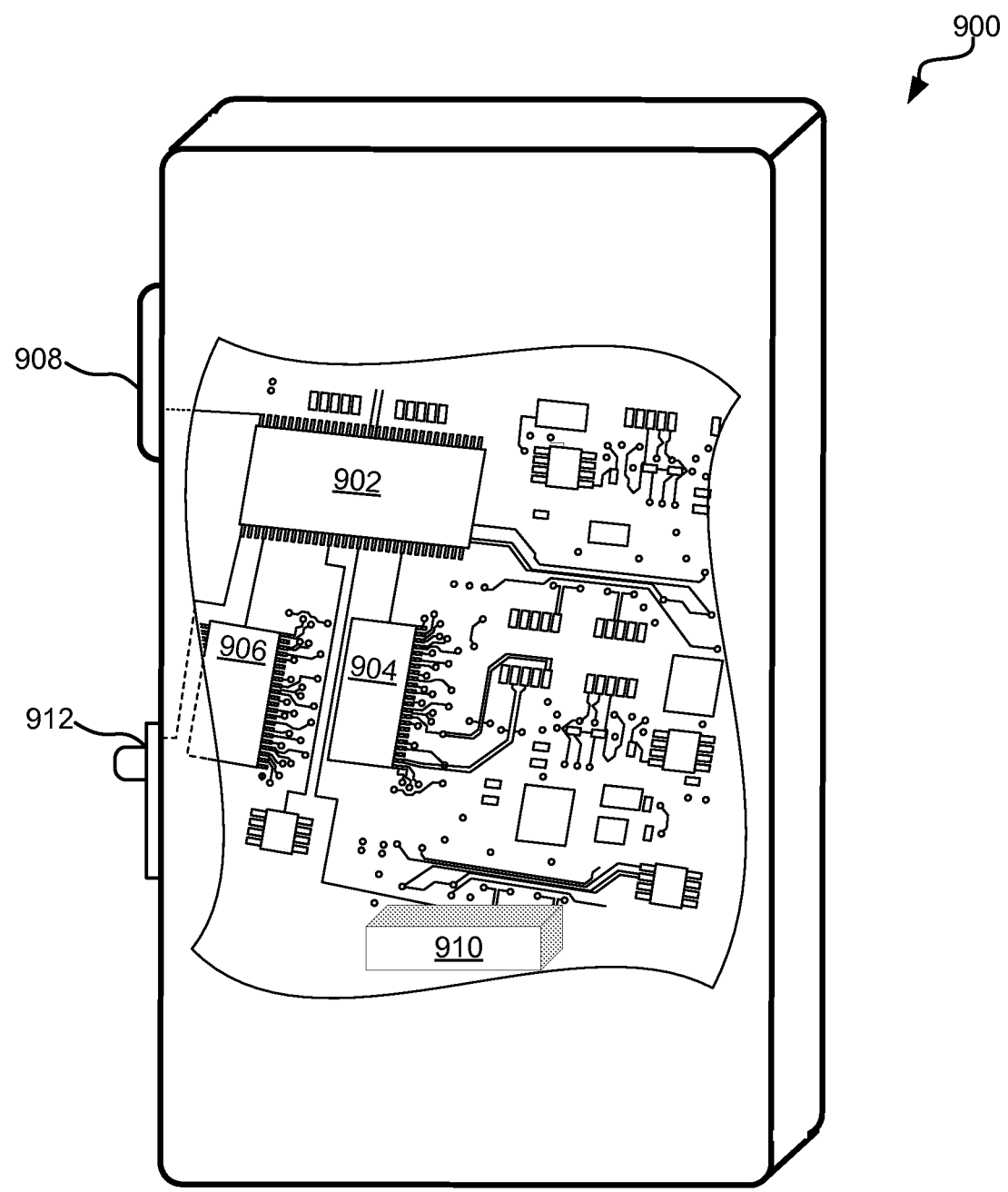
FIG. 9 is a system block diagram of a PTT/PTX external case for use with various embodiments.

FIG. 9 illustrates an example of a PTT/PTX external case 900 that may be utilized in implementing the various embodiments. The PTT/PTX external case 900 may include a processor 902 coupled to internal memory 904 and a Bluetooth® wireless transceiver 906 coupled to the processor 902. The PTT/PTX external case may further include one or more physical keys coupled to the processor 902, such as a hard PTT key 908 and a multi-position mode or capabilities selection switch 912. The processor 902 may also be connected to a battery 910 to enable the PTT/PTX external case to operate without drawing power from the wireless communication device.

Figure 10:
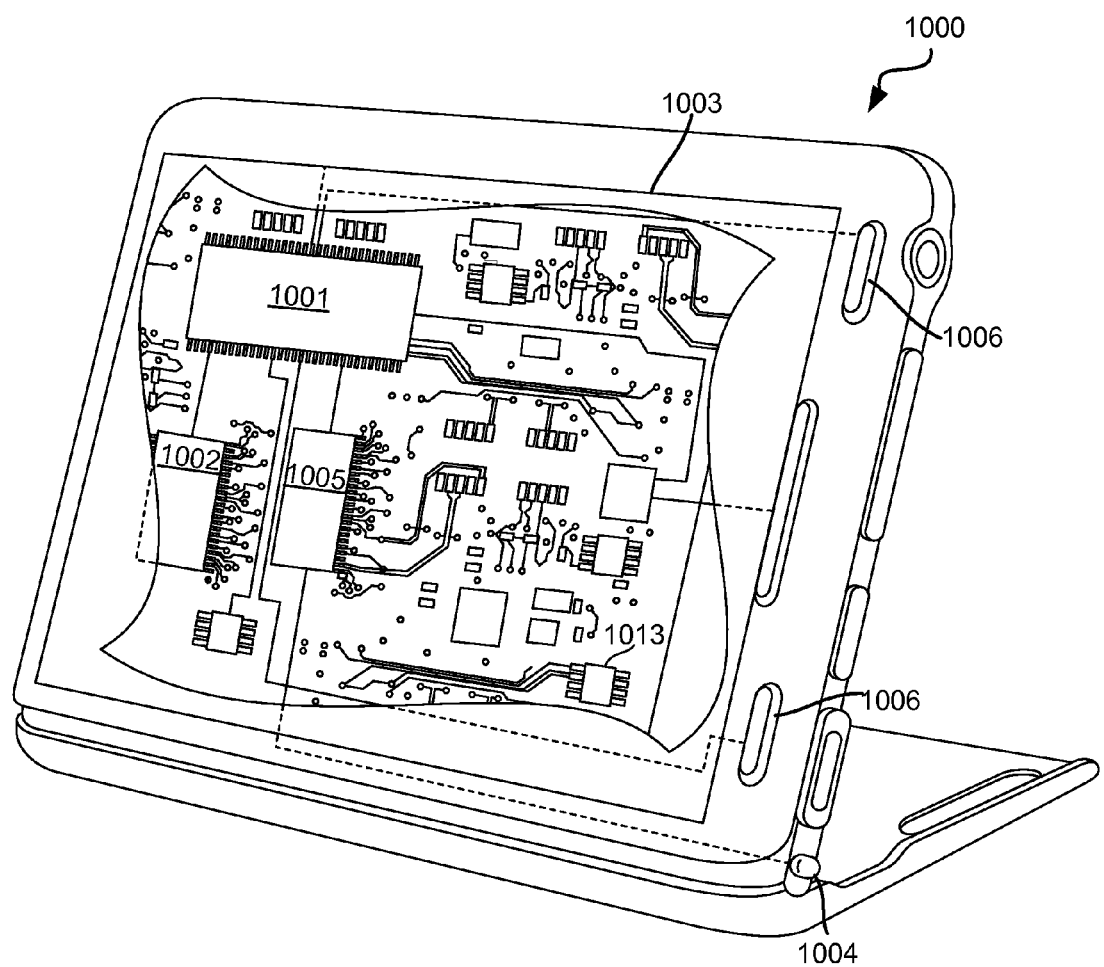
FIG. 10 is a system block diagram of a wireless communication device for use with various embodiments.

FIG. 10 illustrates an example of a wireless communication device that may be utilized in implementing the various embodiments. The wireless communication device 1000, such as a smartphone, may include a processor 1001 coupled to memory 1002 and to a radio frequency (RF) data modem 1005. The modem 1005 may be coupled to an antenna 1004 for receiving and transmitting RF signals. The mobile device 1000 may also include a display 1003, such as a touch screen display. The mobile device 1000 may also include user input devices, such as buttons 1006, to receive user inputs. The mobile device processor 1001 may be any programmable microprocessor, microcomputer or multiple processor chip or chips that can be configured by software instructions (applications) to perform a variety of functions, including the functions of the various embodiments described herein. Typically, software applications may be stored in the internal memory 1002 before they are accessed and loaded into the processor 1001. In some mobile computing devices, additional memory chips (e.g., a Secure Data (SD) card) may be plugged into the mobile device and coupled to the processor 1001. The internal memory 1002 may be a volatile or nonvolatile memory, such as flash memory, or a mixture of both. For the purposes of this description, a general reference to memory refers to all memory accessible by the processor 1001, including internal memory 1002, removable memory plugged into the mobile device, and memory within the processor 1001.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium. The steps of a method or algorithm disclosed herein may be embodied in a processor-executable software module which may reside on a non-transitory computer-readable medium or processor-readable medium. Non-transitory computer-readable and processor-readable media may be any available media that may be accessed by a computer or processor. By way of example, and not limitation, such non-transitory computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the principles and novel features disclosed herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

What is claimed is:

1. A method for enabling a communication link functionality on a wireless device, comprising:
   detecting a connection between the wireless device and an external structure associated with the wireless device being positioned in the external structure, the external structure comprising one or more physical buttons and a switch, the external structure being configured to implement a plurality of modes in the wireless device;
   activating the communication link functionality in response to detecting the connection, wherein activating the communication link functionality comprises:
      determining a type and a features set of the external structure;
      executing a group communications application on the wireless device; and
      enabling one or more group communication capabilities that are supported by the external structure;
   implementing one of the plurality of modes based on a position of the switch on the external structure, each mode enabling a different subset of the features set, wherein the plurality of modes comprises a listen-only mode, wherein the listen-only mode is associated with:
      enabling a capability for receiving talk spurts at the wireless device;
      activating a speaker on the wireless device; and
      disabling a capability for initiating group communications.

2. The method of claim 1, further comprising deactivating the communication link functionality in response to detecting a disconnection of the wireless device from the external structure.

3. The method of claim 1, wherein the external structure is a case for the wireless device.

4. The method of claim 1, wherein the external structure is a holster configured to hold the wireless device.

5. The method of claim 1, further comprising:
   receiving a key-press code from the external structure at the wireless device;
   interpreting the key-press code received from the external structure as a push-to-talk activation event; and
   activating a push-to-talk transmission in response to receiving the key-press code.

6. The method of claim 5, wherein the key-press code from the external structure is received at the wireless device in response to a depressing of one or more of the physical buttons on the external structure.

7. The method of claim 1, wherein power is provided to the external structure from the wireless device via a connector port.

8. The method of claim 1, wherein the external structure comprises a battery configured to provide power to the external structure.

9. The method of claim 1, wherein the features set comprises one or more data presets associated with group communications, wherein the one or more data presets are stored in the external structure.

10. The method of claim 9, wherein the one or more data presets are transferred from the external structure to the wireless device.

11. The method of claim 1, further comprising receiving an identifier from the external structure.

12. The method of claim 11, wherein the identifier is a credential that authenticates the external structure to the wireless device.

13. The method of claim 11, wherein the identifier is received by a physical connection between the wireless device and the external structure.

14. The method of claim 13, wherein the physical connection is through a smartphone-specific connector port on the wireless device.

15. The method of claim 11, wherein the identifier is received over a short distance communication from the external structure to the wireless device.

16. The method of claim 15, wherein the short distance communication is one of a Bluetooth® signal and a near field communication.

17. The method of claim 1, wherein enabling one or more group communication capabilities comprises disabling a display screen of the wireless device when the wireless device receives a group communication.

18. The method of claim 1, wherein enabling one or more group communication capabilities comprises enabling a speaker on the external structure.

19. The method of claim 1, wherein enabling one or more group communication capabilities comprises activating a far field microphone on the external structure.

20. The method of claim 1, wherein the features set comprises a plurality of features sets, wherein each of the plurality of features sets is related to one of optimizing group communications and setting a user presence state for incoming communications.

21. The method of claim 20, wherein:
   the external structure includes a plurality of switches, wherein each of the switches is associated with one of the plurality of features sets;
   the external structure is configured to implement a plurality of modes in the wireless device, wherein each of the modes is associated with enabling on the wireless device a different subset of one of the plurality of features sets; and
   the method further comprises implementing one of the plurality of modes based on a position of one of the plurality of switches.

22. The method of claim 1, wherein the plurality of modes comprises an alert-only mode, wherein the alert-only mode is associated with:
  enabling a capability for receiving group communication alerts at the wireless device;
  disabling a capability for receiving talk spurts; and
  disabling a capability for initiating group communications.

23. The method of claim 1, wherein the plurality of modes comprises an offline mode, wherein the offline mode is associated with disabling all group communication capabilities.

24. The method of claim 1, wherein the plurality of modes comprises a push-to-talk mode, wherein the push-to-talk mode is associated with:
  enabling a capability for receiving push-to-talk communications; and
  enabling a capability for initiating push-to-talk communications.

25. The method of claim 1, wherein the plurality of modes comprises a full activity mode, wherein the full activity mode comprises enabling all group communication capabilities that are supported by the external structure.

26. A wireless device, comprising:
  a radio frequency data modem;
  a memory; and
  a processor coupled to the radio frequency data modem and to the memory, wherein the processor is configured with processor-executable instructions to perform operations comprising:
    detecting a connection to an external structure that is configured to accept the wireless device, wherein the external structure comprises one or more physical buttons and a switch, the external structure being configured to implement a plurality of modes;
    activating a communication link functionality in response to detecting the connection, wherein activating the communication link functionality comprises:
      determining a type and a features set of the external structure;
      executing a group communications application on the wireless device; and
      enabling one or more group communication capabilities that are supported by the external structure;
    implementing one of the plurality of modes based on a position of the switch on the external structure, each mode enabling a different subset of the features set, wherein the plurality of modes comprises a listen-only mode, wherein the listen-only mode is associated with:
      enabling a capability for receiving talk spurts at the wireless device;
      activating a speaker on the wireless device; and
      disabling a capability for initiating group communications.

27. The wireless device of claim 26, wherein the processor is configured with processor-executable instructions to perform operations further comprising:
  detecting a disconnection from the external structure; and
  deactivating the communication link functionality in response to detecting the disconnection.

28. The wireless device of claim 26, wherein the processor is configured with processor-executable instructions to perform operations such that detecting a connection to the external structure that is configured to accept the wireless device comprises detecting a connection to a case for the wireless device.

29. The wireless device of claim 26, wherein the processor is configured with processor-executable instructions to perform operations such that detecting a connection to the external structure that is configured to accept the wireless device comprises detecting a connection to a holster that is configured to hold the wireless device.

30. The wireless device of claim 26, wherein the processor is configured with processor-executable instructions to perform operations further comprising:
  receiving a key-press code from the external structure;
  interpreting the key-press code received from the external structure as a push-to-talk activation event; and
  activating a push-to-talk transmission in response to receiving the key-press code.

31. The wireless device of claim 30, wherein the processor is configured with processor-executable instructions to perform operations such that receiving the key-press code from the external structure comprises receiving a signal transmitted from the external structure, wherein the signal is transmitted in response to depression of one or more physical buttons on the external structure.

32. The wireless device of claim 26, further comprising a battery, wherein the battery provides power to the external structure via a connector port while the external structure is connected to the wireless device.

33. The wireless device of claim 26, wherein the features set comprises one or more data presets associated with group communications, wherein the one or more data presets are stored in the external structure.

34. The wireless device of claim 33, wherein the processor is configured with processor-executable instructions to perform operations further comprising:
  receiving the one or more data presets from the external structure, wherein the one or more data presets are received through a physical connection with the external structure or a short distance communication from the external structure.

35. The wireless device of claim 26, wherein the processor is configured with processor-executable instructions to perform operations further comprising receiving an identifier from the external structure.

36. The wireless device of claim 35, wherein the identifier is a credential that authenticates the external structure to the wireless device.

37. The wireless device of claim 35, wherein the processor is configured with processor-executable instructions to perform operations such that receiving the identifier from the external structure comprises receiving the identifier through a physical connection with the external structure.

38. The wireless device of claim 37, wherein the wireless device further comprises a smartphone-specific connector port, and wherein the processor is configured with processor-executable instructions to perform operations such that receiving the identifier through the physical connection with the external structure comprises receiving the identifier through the smartphone-specific connector port.

39. The wireless device of claim 35, wherein the processor is configured with processor-executable instructions to perform operations such that receiving the identifier from the external structure comprises receiving the identifier over a short distance communication from the external structure.

40. The wireless device of claim 39, wherein the short distance communication is one of a Bluetooth® signal and a near field communication.

41. The wireless device of claim 26, wherein the processor is configured with processor-executable instructions to perform operations such that enabling one or more group communication capabilities comprises disabling a display screen of the wireless device when the wireless device receives a group communication.

42. The wireless device of claim 26, wherein the processor is configured with processor-executable instructions to perform operations such that enabling one or more group communication capabilities comprises enabling a speaker on the external structure.

43. The wireless device of claim 26, wherein the processor is configured with processor-executable instructions to perform operations such that enabling one or more group communication capabilities comprises activating a far field microphone on the external structure.

44. The wireless device of claim 26, wherein the processor is configured with processor-executable instructions to perform operations such that determining the features set of the external structure comprises determining a plurality of features sets of the external structure, wherein each of the plurality of features sets relates to one of optimizing group communications and setting a user presence state for incoming communications.

45. The wireless device of claim 44, wherein:
the processor is configured with processor-executable instructions to perform operations further comprising implementing a plurality of modes provided by the external structure, wherein each of the modes is associated with enabling on the wireless device a different subset of one of the plurality of features sets; and
the processor is configured with processor-executable instructions to perform operations further comprising implementing one of the plurality of modes based on a position of one of a plurality of switches on the external structure.

46. The wireless device of claim 26, wherein the plurality of modes comprises an alert-only mode, and wherein the processor is configured with processor-executable instructions to perform operations such that the alert-only mode is associated with:
enabling a capability for receiving group communication alerts;
disabling a capability for receiving talk spurts; and
disabling a capability for initiating group communications.

47. The wireless device of claim 26, wherein the plurality of modes comprises an offline mode, and wherein the processor is configured with processor-executable instructions to perform operations such that the offline mode is associated with disabling all group communication capabilities.

48. The wireless device of claim 26, wherein the plurality of modes comprises a push-to-talk mode, and wherein the processor is configured with processor-executable instructions to perform operations such that the push-to-talk mode is associated with:
enabling a capability for receiving push-to-talk communications; and
enabling a capability for initiating push-to-talk communications.

49. The wireless device of claim 26, wherein the plurality of modes comprises a full activity mode, and wherein the processor is configured with processor-executable instructions to perform operations such that the full activity mode comprises enabling all group communication capabilities that are supported by the external structure.

50. A wireless communication device, comprising:
means for detecting a connection between the wireless communication device and an external structure associated with the wireless communication device being positioned in the external structure configured to accept the wireless communication device and comprising one or more physical buttons and a switch, the external structure being configured to implement a plurality of modes in the wireless device;
means for activating a communication link functionality in response to detecting the connection, wherein the means for activating the communication link functionality further comprises:
means for determining a type and a features set of the external structure;
means for executing a group communications application on the wireless device; and
means for enabling one or more group communication capabilities that are supported by the external structure;
means for implementing one of the plurality of modes based on a position of the switch on the external structure, each mode enabling a different subset of the features set, wherein the plurality of modes comprises a listen-only mode, wherein the listen-only mode is associated with:
means for enabling a capability for receiving talk spurts at the wireless device;
means for activating a speaker on the wireless device; and
means for disabling a capability for initiating group communications.

51. The wireless communication device of claim 50, further comprising:
means for detecting a disconnection from the external structure; and
means for deactivating the communication link functionality in response to detecting the disconnection.

52. The wireless communication device of claim 50, wherein means for detecting a connection to the external structure that is configured to accept the wireless communication device comprises means for detecting a connection to a case for the wireless communication device.

53. The wireless communication device of claim 50, wherein means for detecting a connection to the external structure that is configured to accept the wireless communication device comprises means for detecting a connection to a holster that is configured to hold the wireless communication device.

54. The wireless communication device of claim 50, further comprising:
means for receiving a key-press code from the external structure;
means for interpreting the key-press code received from the external structure as a push-to-talk activation event; and
means for activating a push-to-talk transmission in response to receiving the key-press code.

55. The wireless communication device of claim 54, wherein means for receiving the key-press code from the external structure comprises means for receiving a signal transmitted from the external structure, wherein the signal is transmitted in response to depression of one or more physical buttons on the external structure.

56. The wireless communication device of claim 50, further comprising means for providing power to the external structure while the external structure is connected to the wireless communication device.

57. The wireless communication device of claim 50, wherein the features set comprises one or more data presets associated with group communications, wherein the one or more data presets are stored in the external structure.

23

58. The wireless communication device of claim 57, further comprising:
means for receiving the one or more data presets from the external structure, wherein the one or more data presets are received through a physical connection with the external structure or a short distance communication from the external structure.

59. The wireless communication device of claim 50, further comprising means for receiving an identifier from the external structure.

60. The wireless communication device of claim 59, wherein the identifier is a credential that authenticates the external structure to the wireless communication device.

61. The wireless communication device of claim 59, wherein means for receiving the identifier from the external structure comprises means for receiving the identifier through a physical connection with the external structure.

62. The wireless communication device of claim 61, wherein means for receiving the identifier through the physical connection with the external structure comprises means for receiving the identifier through a smartphone-specific connector port.

63. The wireless communication device of claim 59, wherein means for receiving the identifier from the external structure comprises means for receiving the identifier over a short distance communication from the external structure.

64. The wireless communication device of claim 63, wherein means for receiving the identifier over the short distance communication comprises means for receiving the identifier through one of a Bluetooth® signal and a near field communication.

65. The wireless communication device of claim 50, wherein means for enabling one or more group communication capabilities comprises means for disabling a display screen of the wireless communication device when a group communication is received.

66. The wireless communication device of claim 50, wherein means for enabling one or more group communication capabilities comprises means for enabling a speaker on the external structure.

67. The wireless communication device of claim 50, wherein means for enabling one or more group communication capabilities comprises means for activating a far field microphone on the external structure.

68. The wireless communication device of claim 50, wherein means for determining the features set of the external structure comprises means for determining a plurality of features sets of the external structure, wherein each of the plurality of features sets relates to one of optimizing group communications and setting a user presence state for incoming communications.

69. The wireless communication device of claim 68, further comprising:
means for implementing a plurality of modes provided by the external structure, wherein each of the modes is associated with enabling on the wireless communication device a different subset of one of the plurality of features sets; and
means for implementing one of the plurality of modes based on a position of one of a plurality of switches on the external structure.

70. The wireless communication device of claim 50, wherein the plurality of modes comprises an alert-only mode, wherein the alert-only mode is associated with:
means for enabling a capability for receiving group communication alerts;

24 means for disabling a capability for receiving talk spurts; and
means for disabling a capability for initiating group communications.

71. The wireless communication device of claim 50, wherein the plurality of modes is an offline mode, wherein the offline mode is associated with means for disabling all group communication capabilities.

72. The wireless communication device of claim 50, wherein the plurality of modes is a push-to-talk mode, wherein the push-to-talk mode is associated with:
means for enabling a capability for receiving push-to-talk communications; and
means for enabling a capability for initiating push-to-talk communications.

73. The wireless communication device of claim 50, wherein the plurality of modes is a full activity mode, wherein the full activity mode is associated with means for enabling all group communication capabilities that are supported by the external structure.

74. A non-transitory computer-readable storage medium having stored thereon processor-executable instructions configured to cause a wireless device processor to perform operations comprising:
detecting a connection between the wireless device and an external structure associated with the wireless device being positioned in the external structure comprising one or more physical buttons and a switch, the external structure being configured to implement a plurality of modes in the wireless device;
activating a communication link functionality in response to detecting the connection wherein activating the communication link functionality comprises:
determining a type and a features set of the external structure;
executing a group communications application on the wireless device; and
enabling one or more group communication capabilities that are supported by the external structure;
implementing one of the plurality of modes based on a position of the switch on the external structure, each mode enabling a different subset of the features set, wherein the plurality of modes comprises a listen-only mode, wherein the listen-only mode is associated with:
enabling a capability for receiving talk spurts at the wireless device;
activating a speaker on the wireless device; and
disabling a capability for initiating group communications.

75. The non-transitory computer-readable storage medium of claim 74, wherein the stored processor-executable instructions are configured to cause the wireless device processor to perform operations further comprising:
detecting a disconnection from the external structure; and
deactivating the communication link functionality in response to detecting the disconnection.

76. The non-transitory computer-readable storage medium of claim 74, wherein the stored processor-executable instructions are configured to cause the wireless device processor to perform operations such that detecting a connection to the external structure comprises detecting a connection to a case for the wireless device.

77. The non-transitory computer-readable storage medium of claim 74, wherein the stored processor-executable instructions are configured to cause the wireless device processor to perform operations such that detecting a connection to the external structure comprises detecting a connection to a holster that is configured to hold the wireless device.

78. The non-transitory computer-readable storage medium of claim 74, wherein the stored processor-executable instructions are configured to cause the wireless device processor to perform operations further comprising:
receiving a key-press code from the external structure;
interpreting the key-press code received from the external structure as a push-to-talk activation event; and
activating a push-to-talk transmission in response to receiving the key-press code.

79. The non-transitory computer-readable storage medium of claim 78, wherein the stored processor-executable instructions are configured to cause the wireless device processor to perform operations such that receiving the key-press code from the external structure comprises receiving a signal transmitted from the external structure, wherein the signal is transmitted in response to depression of one or more physical buttons on the external structure.

80. The non-transitory computer-readable storage medium of claim 74, wherein the stored processor-executable instructions are configured to cause the wireless device processor to perform operations further comprising providing power to the external structure via a connector port while the external structure is connected to the wireless device.

81. The non-transitory computer-readable storage medium of claim 74, wherein the features set comprises one or more data presets associated with group communications, wherein the one or more data presets are stored in the external structure.

82. The non-transitory computer-readable storage medium of claim 81, wherein the stored processor-executable instructions are configured to cause the wireless device processor to perform operations further comprising:
receiving the one or more data presets from the external structure, wherein one or more the data presets are received through a physical connection with the external structure or a short distance communication from the external structure.

83. The non-transitory computer-readable storage medium of claim 74, wherein the stored processor-executable instructions are configured to cause the wireless device processor to perform operations further comprising receiving an identifier from the external structure.

84. The non-transitory computer-readable storage medium of claim 83, wherein the stored processor-executable instructions are configured to cause the wireless device processor to perform operations such that the identifier is a credential that authenticates the external structure to the wireless device.

85. The non-transitory computer-readable storage medium of claim 83, wherein the stored processor-executable instructions are configured to cause the wireless device processor to perform operations such that receiving the identifier from the external structure comprises receiving the identifier through a physical connection with the external structure.

86. The non-transitory computer-readable storage medium of claim 85, wherein the stored processor-executable instructions are configured to cause the wireless device processor to perform operations further comprising receiving the identifier through a smartphone-specific connector port.

87. The non-transitory computer-readable storage medium of claim 83, wherein the stored processor-executable instructions are configured to cause the wireless device processor to perform operations such that receiving the identifier from the external structure comprises receiving the identifier over a short distance communication from the external structure.

88. The non-transitory computer-readable storage medium of claim 87, wherein the stored processor-executable instructions are configured to cause the wireless device processor to perform operations such that the short distance communication is one of a Bluetooth® signal and a near field communication.

89. The non-transitory computer-readable storage medium of claim 74, wherein the stored processor-executable instructions are configured to cause the wireless device processor to perform operations such that enabling one or more group communication capabilities comprises disabling a display screen of the wireless device when the wireless device receives a group communication.

90. The non-transitory computer-readable storage medium of claim 74, wherein the stored processor-executable instructions are configured to cause the wireless device processor to perform operations such that enabling one or more group communication capabilities comprises enabling a speaker on the external structure.

91. The non-transitory computer-readable storage medium of claim 74, wherein the stored processor-executable instructions are configured to cause the wireless device processor to perform operations such that enabling one or more group communication capabilities comprises activating a far field microphone on the external structure.

92. The non-transitory computer-readable storage medium of claim 74, wherein the stored processor-executable instructions are configured to cause the wireless device processor to perform operations such that determining the features set of the external structure comprises determining a plurality of features sets of the external structure, wherein each of the plurality of features sets relates to one of optimizing group communications and setting a user presence state for incoming communications.

93. The non-transitory computer-readable storage medium of claim 92, wherein the stored processor-executable instructions are configured to cause the wireless device processor to perform operations further comprising:
implementing a plurality of modes provided by the external structure, wherein each of the modes is associated with enabling on the wireless device a different subset of one of the plurality of features sets; and
implementing one of the plurality of modes based on a position of one of a plurality of switches on the external structure.

94. The non-transitory computer-readable storage medium of claim 74, wherein the stored processor-executable instructions are configured to cause the wireless device processor to perform operations such that the plurality of modes comprises an alert-only mode, wherein the alert-only mode is associated with:
enabling a capability for receiving group communication alerts;
disabling a capability for receiving talk spurts; and
disabling a capability for initiating group communications.

95. The non-transitory computer-readable storage medium of claim 74, wherein the stored processor-executable instructions are configured to cause the wireless device processor to perform operations such that the plurality of modes comprises an offline mode, wherein the offline mode is associated with disabling all group communication capabilities.

96. The non-transitory computer-readable storage medium of claim 74, wherein the stored processor-executable instructions are configured to cause the wireless device processor to perform operations such that the plurality of modes comprises a push-to-talk mode, wherein the push-to-talk mode is associated with:

enabling a capability for receiving push-to-talk communications; and enabling a capability for initiating push-to-talk communications.

97. The non-transitory computer-readable storage medium of claim 74, wherein the stored processor-executable instructions are configured to cause the wireless device processor to perform operations such that the plurality of modes comprises a full activity mode, wherein the full activity mode comprises enabling all group communication capabilities that are supported by the external structure.

98. A communication system, comprising:
a wireless device; and
a removable external structure, the removable external structure being configured to implement a plurality of modes in the wireless device;
wherein the removable external structure comprises:
  a case structure configured to fit over the wireless device;
  a physical button and a switch positioned on the case structure;
  a first circuit coupled to the physical button; and
  a second circuit configured to cause a connection with the wireless device, and
wherein the wireless device is configured to:
  detect a connection with the removable external structure;
  activate a communication link functionality in response to detecting the connection, wherein activating the communication link functionality comprises:
    determining a type and a features set of the removable external structure;
    executing a group communications application on the wireless device; and
    enabling one or more group communication capabilities that are supported by the removable external structure;
  implement one of the plurality of modes based on a position of the switch on the removable external structure, each mode enabling a different subset of the features set, wherein the plurality of modes comprises a listen-only mode, wherein the listen-only mode is associated with:
    enabling a capability for receiving talk spurts at the wireless device;
    activating a speaker on the wireless device; and
    disabling a capability for initiating group communications.

99. An external structure for a wireless device, comprising:
an exterior portion configured to fit over the wireless device;
one or more physical buttons and a switch positioned on the exterior portion;
a circuit coupled to a physical button;
an interface configured to establish a connection with the wireless device, wherein the connection enables a communication functionality on the wireless device; and
a processor configured with processor-executable instructions to perform operations comprising:
  determining a type and a features set of the external structure;
  executing a group communications application on the wireless device; and
  enabling one or more group communication capabilities that are supported by the external structure
  implementing one of a plurality of modes based on a position of the switch on the external structure, each mode enabling a different subset of the features set, wherein the plurality of modes comprises a listen-only mode, wherein the listen-only mode is associated with:
    enabling a capability for receiving talk spurts at the wireless device;
    activating a speaker on the wireless device; and
    disabling a capability for initiating group communications.

100. The external structure of claim 99, wherein the exterior portion comprises a case for the wireless device.

101. The external structure of claim 99, wherein the exterior portion comprises a holster configured to hold the wireless device.

102. The external structure of claim 99, wherein the processor is configured with processor-executable instructions to perform operations further comprising communicating a key-press code to the wireless device.

103. The external structure of claim 99, wherein depression of the physical button activates the circuit, wherein the circuit is operable to communicate a key-press code to the wireless device via the interface.

104. The external structure of claim 99, wherein the interface is a connector port, and wherein the external structure receives power from the wireless device via the connector port when the wireless device is connected.

105. The external structure of claim 99, wherein the interface comprises a Bluetooth® wireless transceiver.

106. The external structure of claim 99, further comprising a battery that is independent of a wireless device battery.

107. The external structure of claim 99, further comprising a memory configured to store at least one features set for the wireless device.

108. The external structure of claim 107, wherein the at least one features set comprises one or more data presets associated with group communications.

109. The external structure of claim 99, wherein the processor is configured with processor-executable instructions to perform operations comprising communicating an identifier to the wireless device.

110. The external structure of claim 109, wherein the identifier is communicated to the wireless device by via physical connection.

111. The external structure of claim 109, wherein the identifier is a credential that authenticates the external structure to the wireless device.

112. A method for enabling a communication link functionality on a wireless device, comprising:
detecting a connection between the wireless device and an external structure associated with the wireless device being positioned in the external structure, the external structure comprising one or more physical buttons and a switch, the external structure being configured to implement a plurality of modes in the wireless device;
activating the communication link functionality in response to detecting the connection, wherein activating the communication link functionality comprises:
  determining a type and a features set of the external structure;
  executing a group communications application on the wireless device; and
  enabling one or more group communication capabilities that are supported by the external structure;
implementing one of the plurality of modes based on a position of the switch, each mode enabling a different subset of the features set;

determining whether an alert only group communication mode is enabled on the wireless device;
receiving a talk spurt when the alert only group communication mode is not enabled on the wireless device;
receiving a voice note containing speech recorded from a group communication attempt when the alert only group communication mode is enabled on the wireless device; and
sending an incomplete call notification to a sender of the group communication attempt when it is determined that the wireless device is in the alert only group communication mode.

113. A wireless device, comprising:
a radio frequency data modem;
a memory; and
a processor coupled to the radio frequency data modem and to the memory, wherein the processor is configured with processor-executable instructions to perform operations comprising:
  detecting a connection to an external structure that is configured to accept the wireless device, wherein the external structure comprises one or more physical buttons and a switch, the external structure being configured to implement a plurality of modes;
  activating a communication link functionality in response to detecting the connection, wherein activating the communication link functionality comprises:
    determining a type and a features set of the external structure;
    executing a group communications application on the wireless device; and
    enabling one or more group communication capabilities that are supported by the external structure;
  implementing one of the plurality of modes based on a position of the switch, each mode enabling a different subset of the features set;
  determining, based on the mode implemented, whether a capability for receiving talk spurts is disabled;
  receiving a voice note containing speech recorded from a group communication attempt when the capability for receiving talk spurts is disabled; and
  sending an incomplete call notification to a sender of the group communication attempt when the capability for receiving talk spurts is disabled.

114. A wireless communication device, comprising:
means for detecting a connection between the wireless communication device and an external structure associated with the wireless communication device being positioned in the external structure configured to accept the wireless communication device and comprising one or more physical buttons and a switch, the external structure being configured to implement a plurality of modes in the wireless device;
means for activating a communication link functionality in response to detecting the connection, wherein the means for activating the communication link functionality further comprises:
  means for determining a type and a features set of the external structure;
  means for executing a group communications application on the wireless device; and
  means for enabling one or more group communication capabilities that are supported by the external structure;
means for implementing one of the plurality of modes based on a position of the switch on the external structure, each mode enabling a different subset of the features set;
means for determining, based on the mode implemented, whether a capability for receiving talk spurts is disabled;
means for receiving a voice note containing speech recorded from a group communication attempt when the capability for receiving talk spurts is disabled; and
means for sending an incomplete call notification to a sender of the group communication attempt when the capability for receiving talk spurts is disabled.

115. A non-transitory computer-readable storage medium having stored thereon processor-executable instructions configured to cause a wireless device processor to perform operations comprising:
detecting a connection between the wireless device and an external structure associated with the wireless device being positioned in the external structure comprising one or more physical buttons and a switch, the external structure being configured to implement a plurality of modes in the wireless device;
activating a communication link functionality in response to detecting the connection, wherein activating the communication link functionality comprises:
  determining a type and a features set of the external structure;
  executing a group communications application on the wireless device; and
  enabling one or more group communication capabilities that are supported by the external structure;
implementing one of the plurality of modes based on a position of the switch on the external structure, each mode enabling a different subset of the features set;
determining, based on the mode implemented, whether a capability for receiving talk spurts is disabled;
receiving a voice note containing speech recorded from a group communication attempt when the capability for receiving talk spurts is disabled; and
sending an incomplete call notification to a sender of the group communication attempt, when the capability for receiving talk spurts is disabled.

* * * * *